US011402248B2

(12) United States Patent
Gledhill, III et al.

(10) Patent No.: US 11,402,248 B2
(45) Date of Patent: *Aug. 2, 2022

(54) FLOW SENSOR DEVICES AND SYSTEMS

(71) Applicant: Blue-White Industries, Ltd., Huntington Beach, CA (US)

(72) Inventors: Robert E. Gledhill, III, Huntington Beach, CA (US); John T. Nguyen, Fountain Valley, CA (US); Patrick Michael Murphy, Irvine, CA (US); Keith R. Petros, Orange, CA (US); Jennifer A. Tsuyuki, Long Beach, CA (US); Taylor L. Gledhill, Huntington Beach, CA (US); Jason Alan Woolard, Huntington Beach, CA (US); William M. McDowell, Garden Grove, CA (US); Darrell B. Freeman, Lakewood, CA (US); Raul Vazquez, Anaheim, CA (US)

(73) Assignee: Blue-White Industries, Ltd., Huntington Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/201,845

(22) Filed: Mar. 15, 2021

(65) Prior Publication Data

US 2022/0034693 A1 Feb. 3, 2022

Related U.S. Application Data

(63) Continuation of application No. 16/003,796, filed on Jun. 8, 2018, now Pat. No. 10,948,320, which is a
(Continued)

(51) Int. Cl.
*G01F 1/37* (2006.01)
*G01P 5/02* (2006.01)
(Continued)

(52) U.S. Cl.
CPC ............... *G01F 1/372* (2013.01); *G01F 1/24* (2013.01); *G01P 5/02* (2013.01); *G01P 5/16* (2013.01);
(Continued)

(58) Field of Classification Search
CPC ..... G01F 1/22; G01F 1/24; G01F 1/46; G01F 1/372; G01P 5/02; G01P 5/16; G01P 5/165; G05D 7/0635
(Continued)

(56) References Cited

U.S. PATENT DOCUMENTS 1,087,988 A * 2/1914 Sheldon .................. G01F 1/46
73/861.66
1,508,017 A 9/1924 Greve
(Continued)

FOREIGN PATENT DOCUMENTS

CN 104198003 12/2014
CN 105318920 A 2/2016
(Continued)

*Primary Examiner* — William M McCalister
(74) *Attorney, Agent, or Firm* — Knobbe, Martens, Olson & Bear, LLP

(57) ABSTRACT

A flow rate assembly can include a fluid flow interface portion having a front facing wall and a back facing wall. The flow interface portion can include an inlet passage within the fluid flow interface portion, an outlet passage within the fluid flow interface portion, at least one inlet aperture extending through the front facing wall of the fluid flow interface portion into the inlet passage, and at least one outlet aperture extending through the back facing wall of the fluid flow interface portion into the outlet passage. In some cases, the fluid flow interface portion includes a plug forming at least a portion of the inlet passage.

9 Claims, 15 Drawing Sheets

Related U.S. Application Data continuation of application No. 15/271,126, filed on Sep. 20, 2016, now Pat. No. 9,996,089.

(60) Provisional application No. 62/222,700, filed on Sep. 23, 2015, provisional application No. 62/221,554, filed on Sep. 21, 2015.

(51) Int. Cl.
| | | |
|---|---|---|
| *G01P 5/16* | (2006.01) | |
| *G01P 5/165* | (2006.01) | |
| *G01F 1/46* | (2006.01) | |
| *G01F 1/24* | (2006.01) | |
| *G05D 7/06* | (2006.01) | |
| *G01F 1/22* | (2006.01) | |

(52) U.S. Cl.
CPC ............ *G01P 5/165* (2013.01); *G05D 7/0635* (2013.01); *G01F 1/22* (2013.01); *G01F 1/46* (2013.01)

(58) Field of Classification Search
USPC ...................................................... 73/861.49
See application file for complete search history.

(56) References Cited

U.S. PATENT DOCUMENTS

| | | | | |
|---|---|---|---|---|
| 1,556,910 | A * | 10/1925 | Cabot | G01F 1/375 73/861.49 |
| 1,577,909 | A * | 3/1926 | Kath | G01F 1/375 73/861.49 |
| 1,621,354 | A * | 3/1927 | Dawley | G01F 1/72 73/861.49 |
| 1,674,481 | A * | 6/1928 | Paulison, Jr. | G01F 1/375 73/861.49 |
| 1,858,399 | A * | 5/1932 | Jones | G01F 1/375 73/861.49 |
| 1,891,155 | A * | 12/1932 | Harrison | G01F 1/372 73/861.49 |
| 1,898,951 | A * | 2/1933 | Goodwin | G01F 9/026 73/861.49 |
| 1,916,920 | A * | 7/1933 | Diehl | G01F 1/375 73/861.49 |
| 1,924,076 | A * | 8/1933 | Wallace | G01F 1/37 73/861.49 |
| 1,935,508 | A * | 11/1933 | Lanham | G01F 1/375 73/861.49 |
| 2,344,512 | A * | 3/1944 | Lanham | G01F 1/375 73/861.49 |
| 2,679,163 | A * | 5/1954 | Morris | G01P 5/165 73/167 |
| 2,686,429 | A * | 8/1954 | West | G01F 1/375 73/713 |
| 2,704,342 | A * | 3/1955 | John | G01F 23/245 318/675 |
| 2,714,168 | A * | 7/1955 | Hencke | G01F 1/372 250/356.2 |
| 3,140,606 | A * | 7/1964 | Kramer | G01F 1/28 73/861.49 |
| 3,581,565 | A | 6/1971 | Dieterich | |
| 3,803,921 | A | 4/1974 | Dieterich | |
| 3,831,448 | A * | 8/1974 | Kors | G01F 1/375 73/861.65 |
| 3,838,599 | A * | 10/1974 | Purtell | G01F 1/375 73/861.49 |
| 4,003,252 | A | 1/1977 | Dewath | |
| 4,154,100 | A * | 5/1979 | Harbaugh | G01F 1/46 73/861.66 |
| 4,164,865 | A | 8/1979 | Hall et al. | |
| 4,290,314 | A | 9/1981 | Geronime | |
| 4,453,419 | A * | 6/1984 | Engelke | G01F 1/46 73/861.66 |
| 4,546,655 | A | 10/1985 | Victor | |
| 4,696,194 | A | 9/1987 | Taylor | |
| 4,703,661 | A * | 11/1987 | Evers | G01F 1/46 73/861.66 |
| 4,719,806 | A | 1/1988 | Craigen | |
| 5,014,559 | A | 5/1991 | Lew | |
| 5,036,711 | A | 8/1991 | Good | |
| 5,043,706 | A | 8/1991 | Oliver | |
| 5,052,230 | A | 10/1991 | Lang et al. | |
| 5,243,863 | A | 9/1993 | Gill | |
| 5,383,369 | A | 1/1995 | Khuri-Yakub et al. | |
| 5,461,931 | A | 10/1995 | Gill | |
| 5,717,145 | A | 2/1998 | Yasuhara et al. | |
| 5,768,937 | A | 6/1998 | Wajid et al. | |
| 5,817,950 | A | 10/1998 | Wiklund et al. | |
| 5,864,067 | A | 1/1999 | Ligneul et al. | |
| 5,905,207 | A | 5/1999 | Schalk | |
| 5,969,266 | A * | 10/1999 | Mahoney | G01F 1/46 73/861.65 |
| 5,971,011 | A | 10/1999 | Price | |
| 6,298,735 | B1 | 10/2001 | Dias et al. | |
| 6,321,166 | B1 * | 11/2001 | Evans | G01F 1/46 702/50 |
| 6,487,918 | B1 * | 12/2002 | DeAngelis | G01F 1/46 73/861.66 |
| 6,575,044 | B1 | 6/2003 | Feller | |
| 6,658,710 | B2 | 12/2003 | Dias et al. | |
| 6,957,586 | B2 * | 10/2005 | Sprague | G01F 1/3209 73/204.21 |
| 6,973,833 | B2 | 12/2005 | Ginesi et al. | |
| 7,001,153 | B2 | 2/2006 | McDowell et al. | |
| 7,213,468 | B2 | 5/2007 | Fujimoto | |
| 7,243,556 | B2 * | 7/2007 | Gryc | G01F 1/46 73/861.65 |
| 7,284,964 | B2 | 10/2007 | McDowell et al. | |
| 7,343,823 | B2 * | 3/2008 | Speldrich | G01F 1/46 73/861.65 |
| 7,360,448 | B2 | 4/2008 | Maginnis et al. | |
| 7,373,840 | B2 | 5/2008 | Kamimura | |
| 7,383,741 | B2 | 6/2008 | Fukano et al. | |
| 7,423,931 | B2 | 9/2008 | Martin, II et al. | |
| 7,497,138 | B2 * | 3/2009 | Kubinski | F01N 13/008 73/114.71 |
| 7,819,022 | B2 | 10/2010 | Hope | |
| 7,823,463 | B1 | 11/2010 | Feller | |
| 7,870,793 | B1 | 1/2011 | Feller | |
| 7,963,174 | B2 | 6/2011 | Kamimura | |
| 7,997,149 | B1 | 8/2011 | Dam | |
| 8,181,536 | B2 | 5/2012 | Augenstein et al. | |
| 8,215,931 | B2 | 7/2012 | McDowell et al. | |
| 8,336,574 | B2 * | 12/2012 | Kranz | G05D 16/0683 137/484.8 |
| 8,418,364 | B2 | 4/2013 | McDowell et al. | |
| 8,505,391 | B1 | 8/2013 | Baumoel | |
| 8,522,623 | B2 | 9/2013 | Quin et al. | |
| 8,522,624 | B2 | 9/2013 | Quin et al. | |
| 8,584,531 | B2 | 11/2013 | Liao et al. | |
| 8,590,397 | B2 | 11/2013 | Augenstein et al. | |
| 8,639,363 | B2 | 1/2014 | Gledhill, III et al. | |
| 8,640,529 | B2 | 2/2014 | Sinha | |
| 8,960,017 | B2 | 2/2015 | Schwarz | |
| 8,997,848 | B2 | 4/2015 | Quin et al. | |
| 9,062,994 | B2 | 6/2015 | Ifft et al. | |
| 9,134,157 | B2 | 9/2015 | Van Klooster et al. | |
| 9,151,648 | B2 | 10/2015 | Strom et al. | |
| 9,157,775 | B2 | 10/2015 | Strom et al. | |
| 9,182,259 | B2 | 11/2015 | Suzuki et al. | |
| 9,194,730 | B2 | 11/2015 | Frisby et al. | |
| 9,228,870 | B2 | 1/2016 | Quin et al. | |
| 9,234,779 | B2 | 1/2016 | Sinha | |
| 9,250,108 | B2 | 2/2016 | Wiklund | |
| 9,261,389 | B2 | 2/2016 | Gill et al. | |
| 9,297,680 | B2 | 3/2016 | Maruyama et al. | |
| 9,297,681 | B2 | 3/2016 | Speidel | |
| 9,310,236 | B2 | 4/2016 | Baumoel | |
| 9,347,809 | B2 | 5/2016 | Iwasa | |
| 9,366,556 | B2 | 6/2016 | Schwarz | |
| 9,374,024 | B2 | 6/2016 | Nguyen et al. | |

(56) References Cited

U.S. PATENT DOCUMENTS

| | | |
|---|---|---|
| 9,383,236 B2 | 7/2016 | Kempner et al. |
| 9,389,109 B2 | 7/2016 | Gledhill, III et al. |
| 9,423,283 B2 | 8/2016 | Strom et al. |
| 9,702,743 B2 | 7/2017 | Strom et al. |
| 9,777,720 B2 | 10/2017 | Gledhill, III et al. |
| 9,828,984 B2 | 11/2017 | Gledhill, III et al. |
| 9,909,579 B2 | 3/2018 | Gledhill, III et al. |
| 9,996,089 B2 | 6/2018 | Gledhill, III et al. |
| 10,330,094 B2 | 6/2019 | Gledhill, III et al. |
| 10,948,320 B2 | 3/2021 | Gledhill, III et al. |
| 11,131,300 B2 | 9/2021 | Gledhill, III et al. |
| 11,150,118 B2 | 10/2021 | Gledhill, III et al. |
| 11,221,004 B2 | 1/2022 | Gledhill, III et al. |
| 2003/0079557 A1 | 5/2003 | Tatum |
| 2004/0194554 A1* | 10/2004 | Nestle ............ G01F 1/44 73/861.49 |
| 2009/0071264 A1 | 3/2009 | Wray |
| 2010/0005655 A1 | 1/2010 | Nguyen |
| 2011/0180172 A1 | 7/2011 | Gledhill, III et al. |
| 2012/0272748 A1 | 11/2012 | Watanabe et al. |
| 2013/0124131 A1 | 5/2013 | Murakami |
| 2013/0345996 A1 | 12/2013 | Satoh et al. |
| 2014/0083199 A1 | 3/2014 | Rogers |
| 2014/0091675 A1 | 4/2014 | Nguyen et al. |
| 2014/0174561 A1 | 6/2014 | Hagihara et al. |
| 2014/0260664 A1 | 9/2014 | Gledhill, III et al. |
| 2015/0127275 A1 | 5/2015 | Hies et al. |
| 2015/0160053 A1 | 6/2015 | Baumoel |
| 2015/0211509 A1 | 7/2015 | Gledhill, III et al. |
| 2015/0260560 A1 | 9/2015 | Quin et al. |
| 2015/0308870 A1 | 10/2015 | Gottlieb et al. |
| 2016/0116317 A1 | 4/2016 | Zhang et al. |
| 2016/0377463 A1 | 12/2016 | Kalvoda |
| 2017/0139430 A1 | 5/2017 | Gledhill, III et al. |
| 2018/0087942 A1 | 3/2018 | Gledhill, III et al. |
| 2018/0291886 A1 | 10/2018 | Gledhill, III et al. |
| 2018/0298891 A1 | 10/2018 | Gledhill, III et al. |
| 2019/0017499 A1 | 1/2019 | Gledhill, III et al. |
| 2020/0149522 A1 | 5/2020 | Gledhill, III et al. |
| 2020/0386593 A1 | 12/2020 | Nguyen et al. |
| 2021/0047209 A1 | 2/2021 | Gledhill, III et al. |
| 2021/0054963 A1 | 2/2021 | Nguyen et al. |
| 2021/0064735 A1 | 3/2021 | Gledhill, III et al. |
| 2021/0324845 A1 | 10/2021 | Nguyen et al. |
| 2021/0348602 A1 | 11/2021 | Nguyen et al. |

FOREIGN PATENT DOCUMENTS

| | | |
|---|---|---|
| CN | 205403870 U | 7/2016 |
| CN | 208921194 U | 5/2019 |
| EP | 0152132 A1 | 8/1985 |
| EP | 2759808 A1 | 7/2014 |
| GB | 1229536 A | 4/1971 |
| GB | 2012056 A | 7/1979 |
| GB | 2555003 A | 4/2018 |
| JP | 5773414 B2 | 7/2015 |
| KR | 1020140056886 A | 5/2014 |
| WO | WO 94/20822 | 9/1994 |
| WO | WO 2018/063990 A1 | 4/2018 |

* cited by examiner

FLOW SENSOR DEVICES AND SYSTEMS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 16/003,796, entitled "FLOW SENSOR DEVICES AND SYSTEMS," filed Jun. 8, 2018, and issued as U.S. Pat. No. 10,948,320, which is a continuation of U.S. patent application Ser. No. 15/271,126, entitled "FLOW SENSOR DEVICES AND SYSTEMS," filed Sep. 20, 2016, and issued as U.S. Pat. No. 9,996,089, which claims the benefit of U.S. Provisional Patent Application No. 62/221,554, entitled "FLOW SENSOR DEVICES AND METHODS," filed on Sep. 21, 2015, and of U.S. Provisional Patent Application No. 62/222,700, entitled "FLOW SENSOR DEVICES AND METHODS," filed on Sep. 23, 2015, each of which are hereby incorporated by reference in their entireties.

TECHNICAL FIELD

Certain embodiments discussed herein relate to devices and systems for measuring flow rate of fluid through pipes.

DISCUSSION OF THE RELATED ART

Pitot tubes, ultrasonic sensors, and other velocity-measuring devices are widely used to measure the rate of fluid flow through pipes and other fluid flow paths. In some cases, the velocity-measuring devices must be spaced certain distances (e.g., along the fluid flow path) from turns, bends, restrictions, diffusions, and other flow path phenomena.

SUMMARY OF THE INVENTIONS

A flow rate assembly can include a fluid flow interface portion having a front facing wall and a back facing wall. The flow interface portion can include an inlet passage within the fluid flow interface portion, an outlet passage within the fluid flow interface portion, at least one inlet aperture extending through the front facing wall of the fluid flow interface portion into the inlet passage, and at least one outlet aperture extending through the back facing wall of the fluid flow interface portion into the outlet passage.

According to some variants, a flow rate assembly can include a fluid flow interface portion. The fluid flow interface portion can include a first end; a second end; and a front facing wall extending at least partially between the first and second ends of the fluid flow interface portion. In some embodiments, the fluid flow interface portion includes a back facing wall extending at least partially between the first and second ends of the fluid flow interface portion opposite the front facing wall of the fluid flow interface portion. The fluid flow interface portion can include an inlet passage within the fluid flow interface portion and extending at least partially between the first and second ends of the fluid flow interface portion, the inlet passage having an upstream end and a downstream end. In some embodiments, the fluid flow interface portion include an outlet passage within the fluid flow interface portion and at least partially separate from the inlet passage, the outlet passage extending at least partially between the first and second ends of the fluid flow interface portion, the outlet passage having an upstream end and a downstream end. In some embodiments, fluid flow interface portion include at least one inlet aperture extending through the front facing wall of the fluid flow interface portion into the inlet passage, each of the at least one inlet apertures defining an inlet area, wherein a total inlet area is defined as a sum of the inlet areas of the at least one inlet apertures. In some embodiments, fluid flow interface portion includes at least one outlet aperture extending through the back facing wall of the fluid flow interface portion into the outlet passage, each of the at least one outlet apertures defining an outlet area, wherein a total outlet area is defined as a sum of the outlet areas of the at least one outlet apertures. In some embodiments, the total outlet area of the at least one outlet aperture is less than 60% of the total inlet area of the at least one inlet aperture.

In some embodiments, the flow rate assembly includes a sensor body having: a first end; a second end configured to connect to the first end of the fluid flow interface portion; a body inlet passage within the sensor body and extending at least partially between the first and second ends of the sensor body, the body inlet passage having an upstream end and a downstream end; and a body outlet passage within the sensor body and extending at least partially between the first and second ends of the sensor body, the body outlet passage having an upstream end and a downstream end, the upstream end of the body outlet passage connected to the downstream end of the body inlet passage. In some embodiments, the upstream end of the body inlet passage is connected to the downstream end of the inlet passage of the fluid flow interface portion, and wherein the downstream end of the body outlet passage is connected to the upstream end of the outlet passage of the fluid flow interface portion.

In some embodiments, the flow rate assembly includes a moving indicator configured to move in response to fluid flow into the at least one inlet aperture of the fluid flow interface portion.

In some embodiments, the flow rate assembly includes a float positioned at least partially within the body inlet passage or at least partially within the body outlet passage.

In some embodiments, the float is configured to move between the upstream and downstream ends of the body inlet passage in response to fluid flow through the at least one inlet aperture of the fluid flow interface portion.

In some embodiments, a position of the float between the upstream and downstream ends of the body inlet passage indicates a flow rate of fluid into the at least one inlet aperture of the fluid flow interface portion.

In some embodiments, the flow rate assembly includes a signal generator connected to the sensor body and configured detect and output signals in response to positioning the moving indicator into or out from a predetermined range between the upstream and downstream ends of the body inlet passage.

In some embodiments, the sensor body is connected to the fluid flow interface portion without use of fasteners or metal components.

In some embodiments, the flow rate assembly includes a pipe. In some embodiments, the fluid flow interface portion is positioned at least partially within the pipe. In some cases, the at least one inlet aperture is oriented toward oncoming flow within the pipe. In some embodiments, the at least one outlet aperture is oriented away from oncoming flow within the pipe.

According to some variants, a flow rate assembly includes a sensor body configured to be positioned at least partially outside of a pipe when the flow rate assembly is installed on a pipe. The flow rate assembly can include a fluid flow interface portion connected to the sensor body and configured to be positioned at least partially within an interior of a pipe when the flow rate assembly is installed on a pipe. The fluid flow interface portion can include an inlet passage, an outlet passage separate from the inlet passage, a plurality of inlet apertures extending through a wall of the fluid flow interface portion into the inlet passage, and an outlet passage extending through a wall of the fluid flow interface portion on a side of the fluid flow interface portion opposite the inlet apertures into the outlet passage.

In some embodiments, the fluid flow interface portion comprises not more than one outlet passage.

In some embodiments, the fluid flow interface portion comprises a total of four inlet apertures.

In some embodiments, the flow rate assembly includes a shut-off signal generator configured to shut off flow through a pipe when the flow rate sensor is installed on a pipe and a flow rate of fluid through the pipe is lower than a predetermined minimum rate or higher than a predetermined maximum rate.

In some embodiments, the shut-off signal generator is a Hall-effect sensor.

In some embodiments, the shut-off signal generator is positioned on the sensor body.

In some embodiments, the flow rate sensor is configured to measure a flow rate of fluid through a pipe within 10% accuracy in a flow rate range between 2 feet per second and 10 feet per second.

In some embodiments, the flow rate sensor is configured to measure flow rate of fluid through a pipe within 5% accuracy in a flow rate range between 2 feet per second and 10 feet per second.

According to some variants, a flow rate assembly includes a sensor body positioned at least partly outside a pipe when the flow rate sensor is installed on the pipe. In some embodiments, the assembly include a fluid flow interface portion connected to the sensor body and positioned at least partially when the pipe when the flow rate sensor is installed on the pipe. In some embodiments, the fluid flow interface portion includes a first end connected to the sensor body, a second end, a length measured from the first end of the fluid flow interface portion and the second end of the fluid flow interface portion, a front face extending at least partially between the first and second ends of the fluid flow interface portion, a rear face extending at least partially between the first and second ends of the fluid flow interface portion opposite the front face. an inlet passage within the fluid flow interface portion and extending along at least a portion of the length of the fluid flow interface portion, an outlet passage within the fluid flow interface portion and separated from the inlet passage, the outlet passage extending along at least a portion of the length of the fluid flow interface portion, a first plurality of inlet apertures extending through the front face into the inlet passage, a second plurality of inlet apertures extending through the front face into the inlet passage, the second plurality of inlet apertures spaced from the first plurality of inlet apertures along the length of the fluid flow interface portion, and/or an outlet aperture extending through the rear face into the outlet passage.

In some embodiments, the average position of the first plurality of inlet apertures is approximately halfway between an axial centerline of the pipe and an internal wall of the pipe.

In some embodiments, the first plurality of inlet apertures includes a total of two inlet apertures and wherein the second plurality of inlet apertures includes a total of two inlet apertures.

In some embodiments, the fluid flow interface portion includes a wetted portion corresponding to the portion of the fluid flow interface portion positioned within the pipe, wherein the wetted portion includes a fixed end and a free end positioned further from the sensor body than the fixed end, and wherein each of the first plurality of inlet apertures is positioned at least one third of a total length of the wetted portion away from the free end of the wetted portion.

In some embodiments, an average position of the first plurality of inlet apertures along the length of the fluid flow interface portion is approximately the same distance from an axial centerline of the pipe as an average position of the second plurality of inlet apertures along the length of the fluid flow interface portion on an opposite side of the axial centerline of the pipe when the flow rate sensor is installed on the pipe, and wherein each of the first plurality of inlet apertures is positioned one side of the axial centerline of the pipe and each of the second plurality of inlet apertures is positioned on another side of the axial centerline of the pipe.

In some embodiments, each of the first plurality of inlet apertures is positioned on a first side of an average position of the inlet apertures along the length of the fluid flow interface portion, and wherein each of the second plurality of inlet apertures is positioned on a second side of the average position of the inlet apertures, opposite the first side.

In some embodiments, a fluid flow interface portion can include a plug configured to mate with a recess in the back side of the fluid flow interface portion. The plug can form at least a portion of the inlet passage of the fluid flow interface portion.

BRIEF DESCRIPTION OF THE DRAWINGS

The present inventions are described with reference to the accompanying drawings, in which like reference characters reference like elements, and wherein.

DETAILED DESCRIPTION OF THE INVENTIONS

Figure 1:
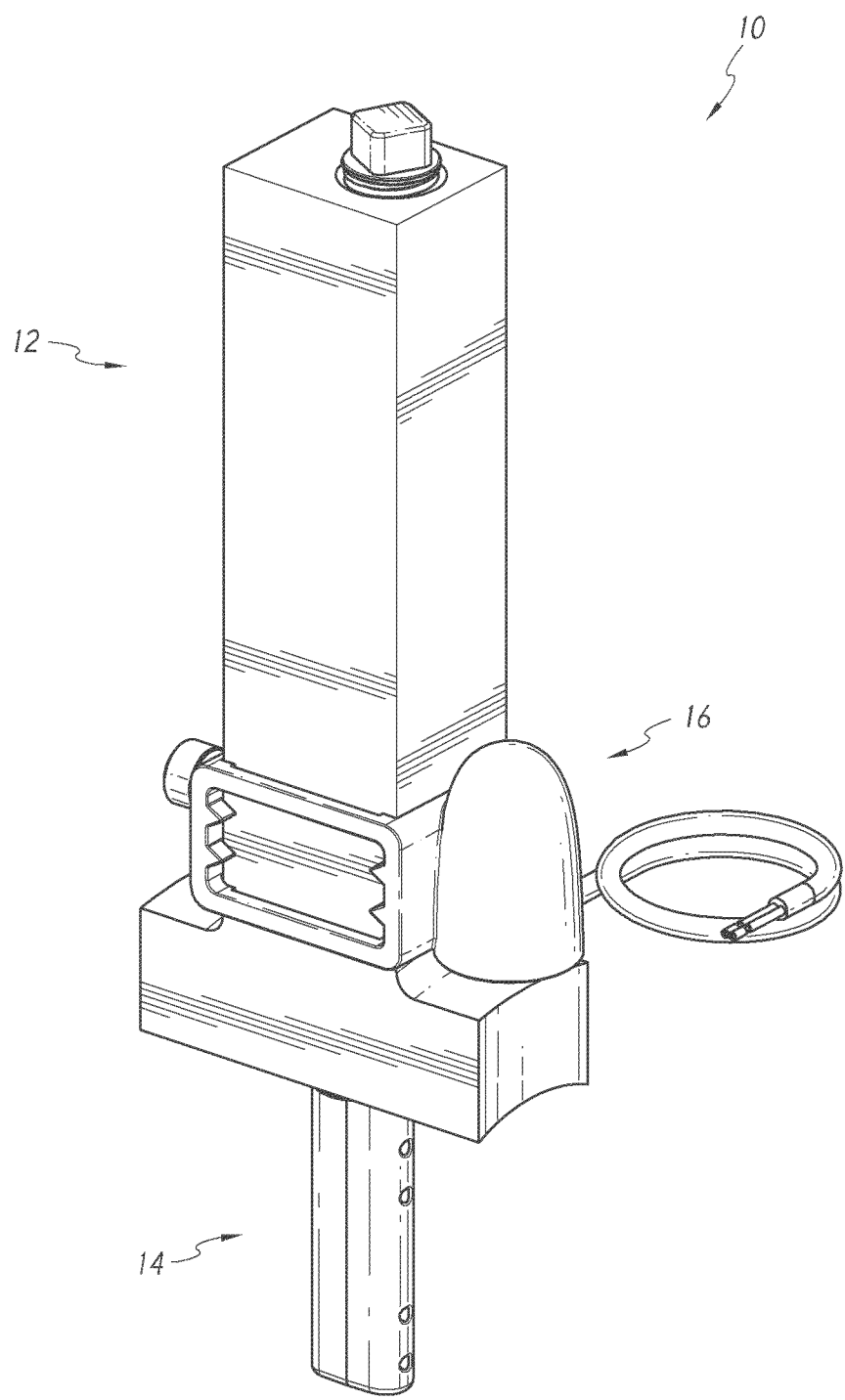
FIG. 1 is top perspective view of an embodiment of a fluid flow sensor.

An embodiment of a flow rate sensor 10 is illustrated in FIG. 1. The flow rate sensor 10 can be installed on a pipe or other component of a fluid flow system. For example, the flow rate sensor 10 can be installed on and/or in a pipe of a pool or spa treatment system. The flow rate sensor 10 can be configured to measure average fluid flow rate in the fluid flow system to which the sensor 10 is installed. In some embodiments, the flow rate sensor 10 measures fluid flow rate without use of any electronic and/or otherwise powered components. For example, the flow rate sensor 10 can be configured to measure fluid flow rate via mechanical response to fluid flow through the fluid flow system (e.g., through a pipe of the fluid flow system). As discussed in more detail below, the flow rate sensor 10 can include one or more signal generating components configured to effect changes in the operation of pumps or other components of a fluid flow system. As such, proper pH levels (e.g., between 7.2-78) and/or proper chlorination or other chemical levels can be maintained in the pool or spa.

As illustrated, the flow rate sensor 10 can include a sensor body 12. The sensor body 12 can be positioned at least partially outside of the pipe or other fluid flow system onto which the sensor 10 is installed. In some embodiments, the sensor body 12 is positioned entirely outside the pipe or other fluid system when the sensor 10 is installed. The sensor body 12 can be formed from injection molding or from milling a polymer, glass, or other material.

The flow rate sensor 10 can include a fluid flow interface portion 14 (e.g., a sensor tube 14). The sensor tube 14 can be connected to the sensor body 12. For example, a first end (e.g., fixed end) of the sensor tube 14 can be adhered, welded, taped, or otherwise connected to the sensor body 12. A second end (e.g., free end) of the sensor tube 14 can be spaced from the sensor body 12. Preferably, the sensor tube 14 is connected to the sensor body 12 without use of metal components (e.g., fasteners or other metal components). Avoiding use of metal components can reduce the risk of oxidation or other structural degradation of the flow rate sensor 10. In some embodiments, the sensor tube 14 is formed via injection molding and/or via milling of a polymer and/or glass. In some embodiments, the sensor body 12 and sensor tube 14 are formed as an integral (e.g., monolithic) part.

In some embodiments, the sensor tube 14 is positioned at least partially within the pipe or other fluid flow system. For example, the sensor tube 14 can extend through a wall of the pipe and into the interior of the pipe onto which the sensor 10 is installed. The sensor tube 14 can include a wetted portion 15 (FIG. 6) defined as the portion of the length of the sensor tube within a pipe when the flow rate sensor 10 is installed.

As illustrated in FIG. 1, the sensor 10 can include a signal generator 16. The signal generator 16 can be connected (e.g., via wired and/or wireless connection) to a flow controller and/or other component of a fluid flow system. The signal generator 16 can be configured to generate an ON/OFF signal or other flow control signal to affect the flow rate through some component of the flow control system in which the sensor 10 is installed. In some embodiments, the signal generator 16 is connected to the sensor body 12.

Figure 2:
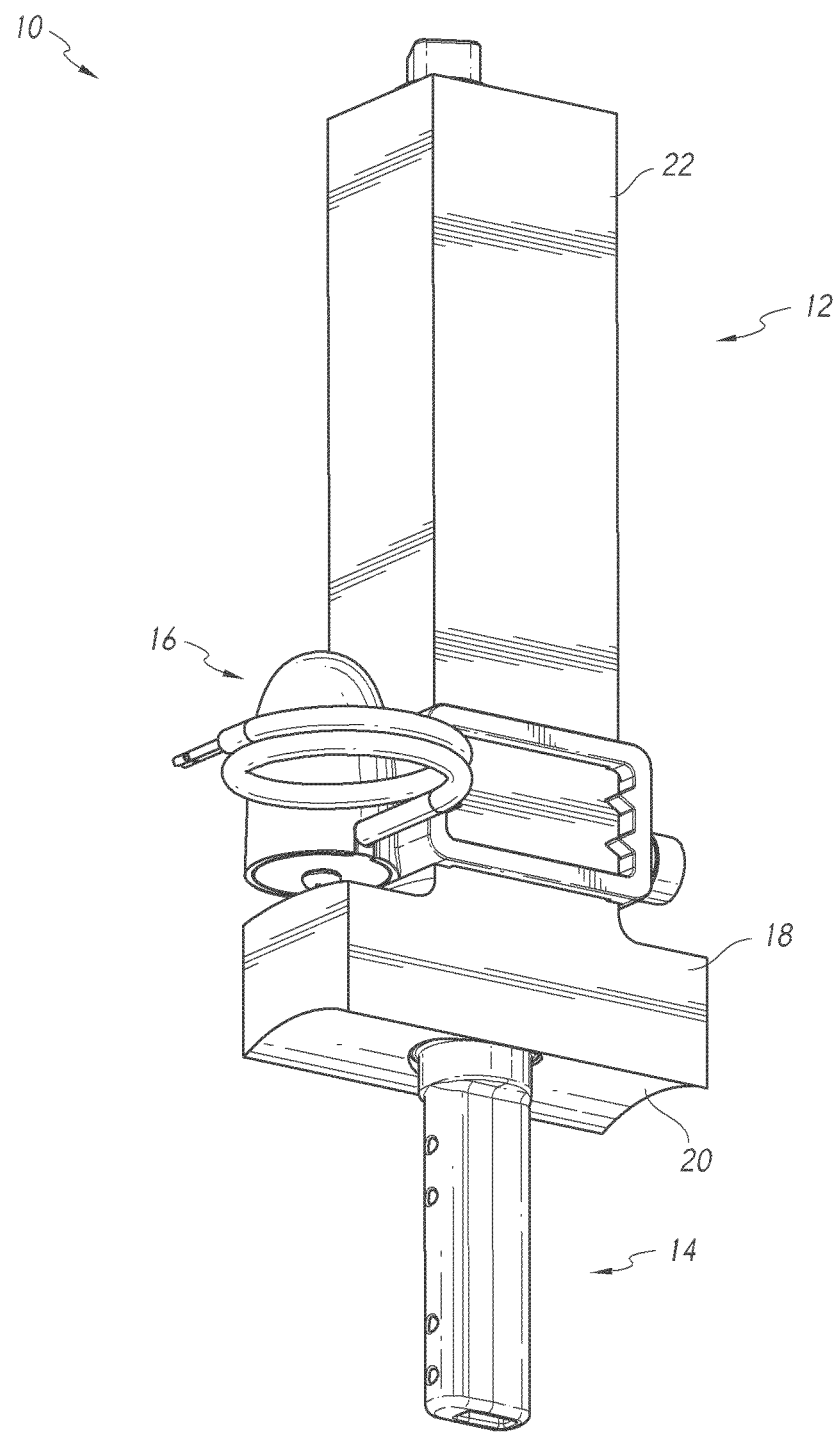
FIG. 2 is a bottom perspective view of the fluid flow sensor of FIG. 1.

As illustrated in FIG. 2, the sensor body 12 can include a base portion 18. The base portion 18 can be configured to engage with a pipe. For example, the base portion of the sensor body 12 can include an engagement surface 20 configured to contact or otherwise engage with a pipe. Preferably, the engagement surface 20 has a concave, stepped, and/or some other shape.

The sensor body 12 can include an elongate portion 22. The elongate portion 22 can be connected to the base portion 18 of the sensor body 12. In some embodiments, the elongate portion 22 and base portion 18 are formed as an integral part.

Figure 3:
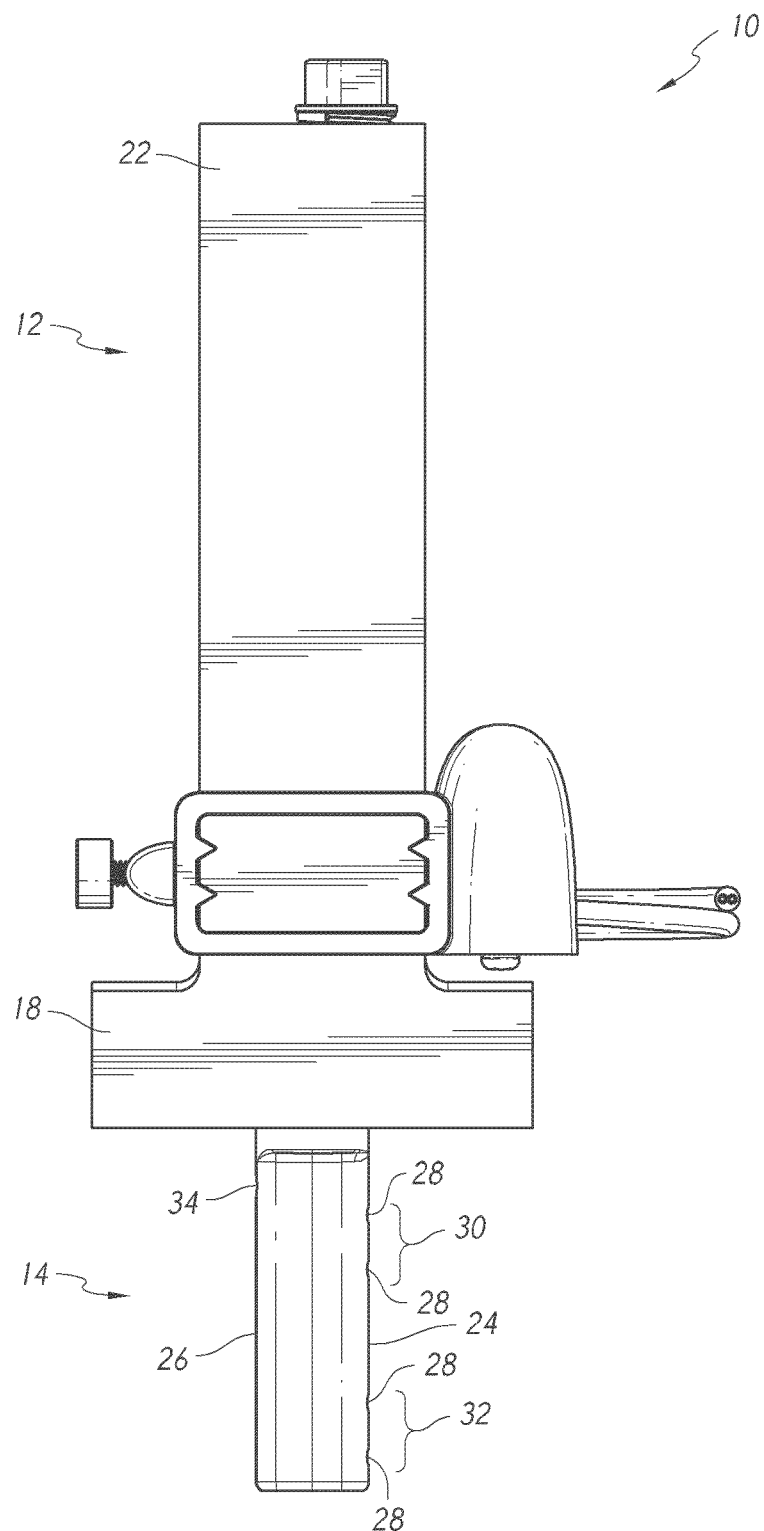
FIG. 3 is a left hand side view of the fluid flow sensor of FIG. 1.

As illustrated in FIG. 3, the sensor tube 14 can have a front side 24 and a back side 26. The front side 24 can be the side of the sensor tube 14 facing oncoming fluid in the pipe when the sensor 10 is installed. The front side 24 can include a front facing wall extending along at least a portion of the length of the sensor tube 14. The back side 26 can be the side of the sensor tube 14 opposite the front side 24. The back side 26 can include a back facing wall extending along at least a portion of the length of the sensor tube 14.

Figure 4:
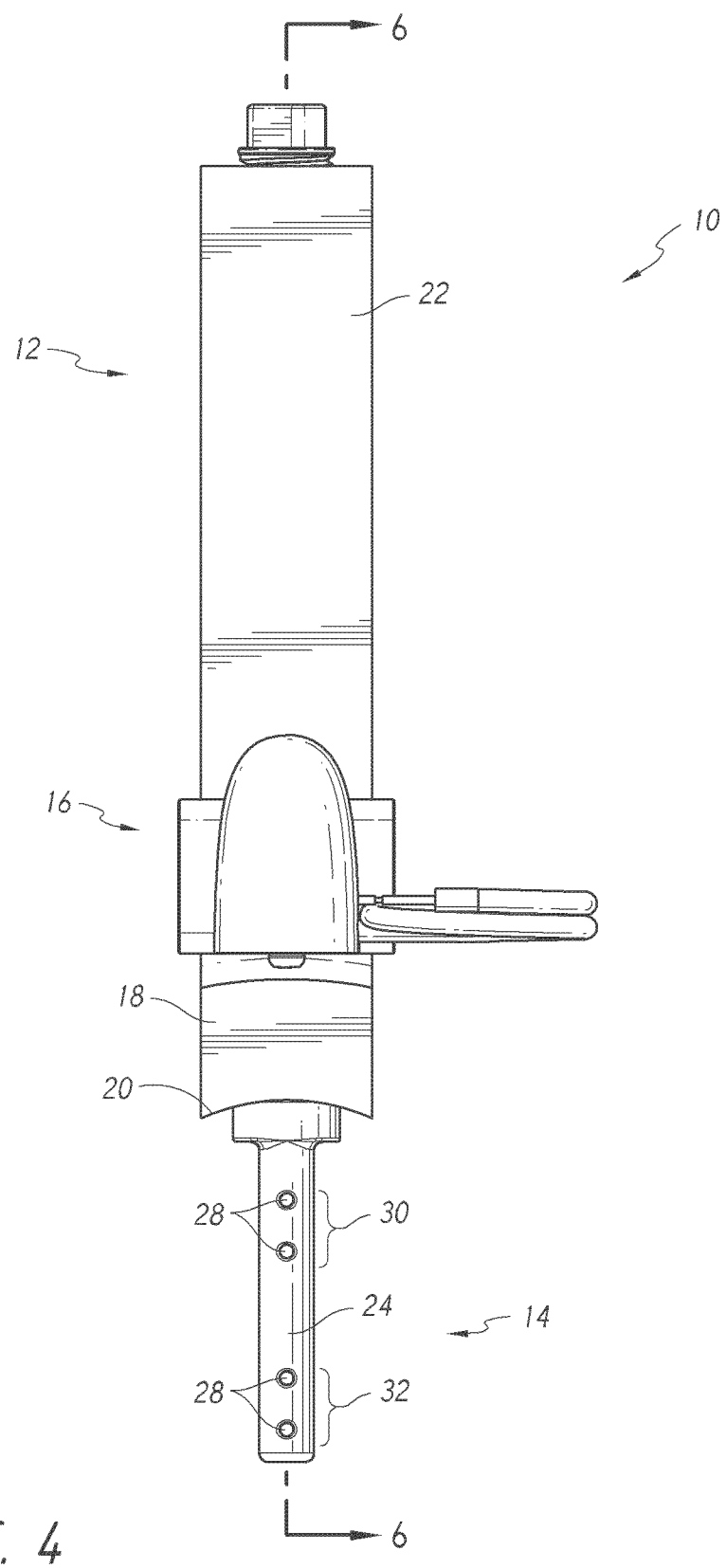
FIG. 4 is a front view of the fluid flow sensor of FIG. 1.

As illustrated in FIGS. 3 and 4, the sensor tube 14 can include one or more inlet apertures 28. The inlet apertures 28 can extend through the front face 24 (e.g., through a front facing wall) of the sensor tube 14. One or more of the inlet apertures 28 can have a same shape and/or cross-sectional area (e.g., as measured on a plane perpendicular to a direction of flow of fluid through the pipe) as one or more of the other inlet apertures 28. In some embodiments, each of the inlet apertures 28 has the same shape and/or cross-sectional area as each of the other inlet apertures 28. In some embodiments, the inlet apertures 28 are arranged in one or more groups or clusters along a length of the sensor tube 14. For example, the sensor tube 14 can include a first group 30 of inlet apertures 28 and a second group 32 of apertures 28, wherein the second group 32 of apertures 28 is further from the sensor body 12 than the first group 30. In some embodiments, the sensor tube 14 includes two groups of two apertures 28, as illustrated in FIG. 3. The apertures 28 can be divided into two groups as defined by their respective positions above (e.g., closer to the fixed end of the tube 14) or below (e.g., closer to the free end of the tube 14) an average position of the apertures 28 along the length of the tube 14. For example, in a case where the sensor tube 14 includes only two inlet apertures 28, the average position of the apertures 28 would be half-way between the two apertures 28. In a configuration wherein an aperture 28 lies coincident with the average position of the apertures 28, the coincidentally-lying aperture 28 is excluded from either group 30, 32.

In some embodiments, the two groups 30, 32 of apertures 28 are distinguished by their respective positions on one side or another side of an axial centerline of a pipe in which the tube 14 is installed. For example, the first group 30 of apertures 28 can be positioned on an upper or lower side of the axial centerline of the pipe, whereas the second group 32 of apertures 28 is positioned on the opposite side of the centerline of the pipe. In some such embodiments, apertures 28 positioned coincident with the axial centerline of the pipe are excluded from either of the first and second groups 30, 32.

Figure 7:
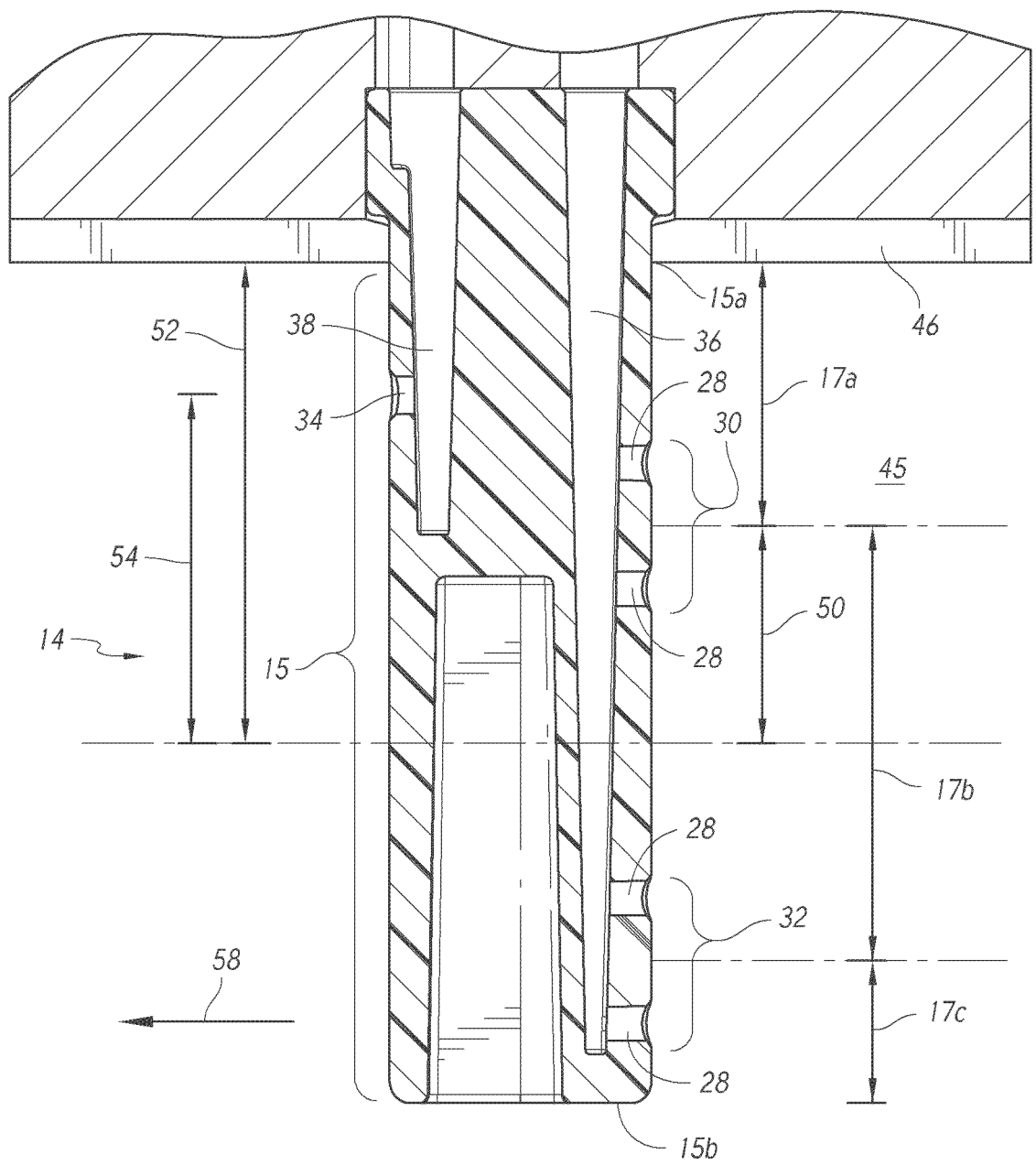
FIG. 7 is a close up cross-sectional view of the sensor tube of the fluid flow sensor of FIG. 1 taken on the plane 6-6 of FIG. 4.

In some embodiments, the two groups 30, 32 of apertures 28 are distinguished by their respective positions with respect to free and fixed ends 15a, 15b of the wetted portion 15 of the tube 14 (FIG. 7). For example, a boundary between the first and second groups 30, 32 of apertures 28 can be positioned at least about $2/5$ of a total length of the wetted portion 15 of the tube 14 away from the free end 15b of the tube 14. In some embodiments, the boundary between the first and second groups 30, 32 of apertures 28 is positioned at least about $1/3$, at least about $1/2$, at least about $4/9$, at least about $5/9$, at least about $4/7$, and/or at least $2/3$ of the total length of the wetted portion 15 of the tube 14 away from the free end 15b of the tube 14. Preferably, the boundary between the first and second groups 30, 32 of apertures 28 is positioned between about $1/2$ and about $1/3$ of the total length of the wetted portion 15 of the tube 14 away from the free end 15b of the tube 14. In some embodiments, the boundary between the first and second groups 30, 32 of apertures 28 is positioned at least about $10/23$ of the total length of the wetted portion 15 of the tube 14 away from the free end 15b of the tube 14. In some such embodiments, apertures 28 positioned coincident with the boundary between the first and second groups 30, 32 of apertures 28 are excluded from either of the first and second groups 30, 32.

Figure 5:
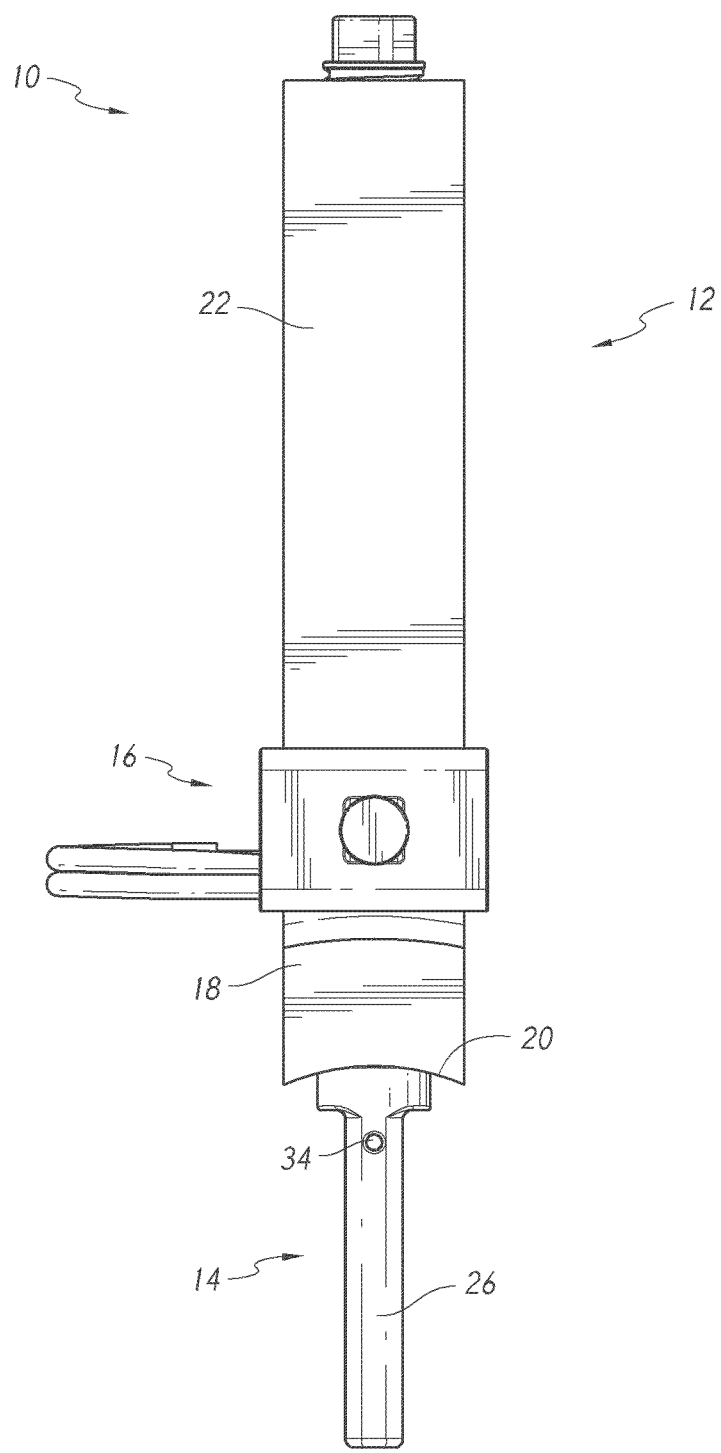
FIG. 5 is a rear view of the fluid flow sensor of FIG. 1.

In some embodiments, the sensor tube 14 includes one or more outlet apertures 34. As illustrated in FIGS. 3 and 5, the one or more outlet apertures 34 can extend through the back side 26 (e.g., through a back facing wall) of the sensor tube 14. In some embodiments, the sensor tube 14 has a total of one outlet aperture 34. The outlet aperture 34 can have a shape and/or cross-sectional area the same as or similar to the shape and/or cross-sectional area of one or more of the inlet apertures 28. In some embodiments, the outlet aperture 34 is positioned closer to the sensor body 12 than the inlet apertures 28. In some embodiments, one or more of the inlet apertures 28 is positioned closer to the sensor body 12 than the outlet aperture 34.

Figure 6:
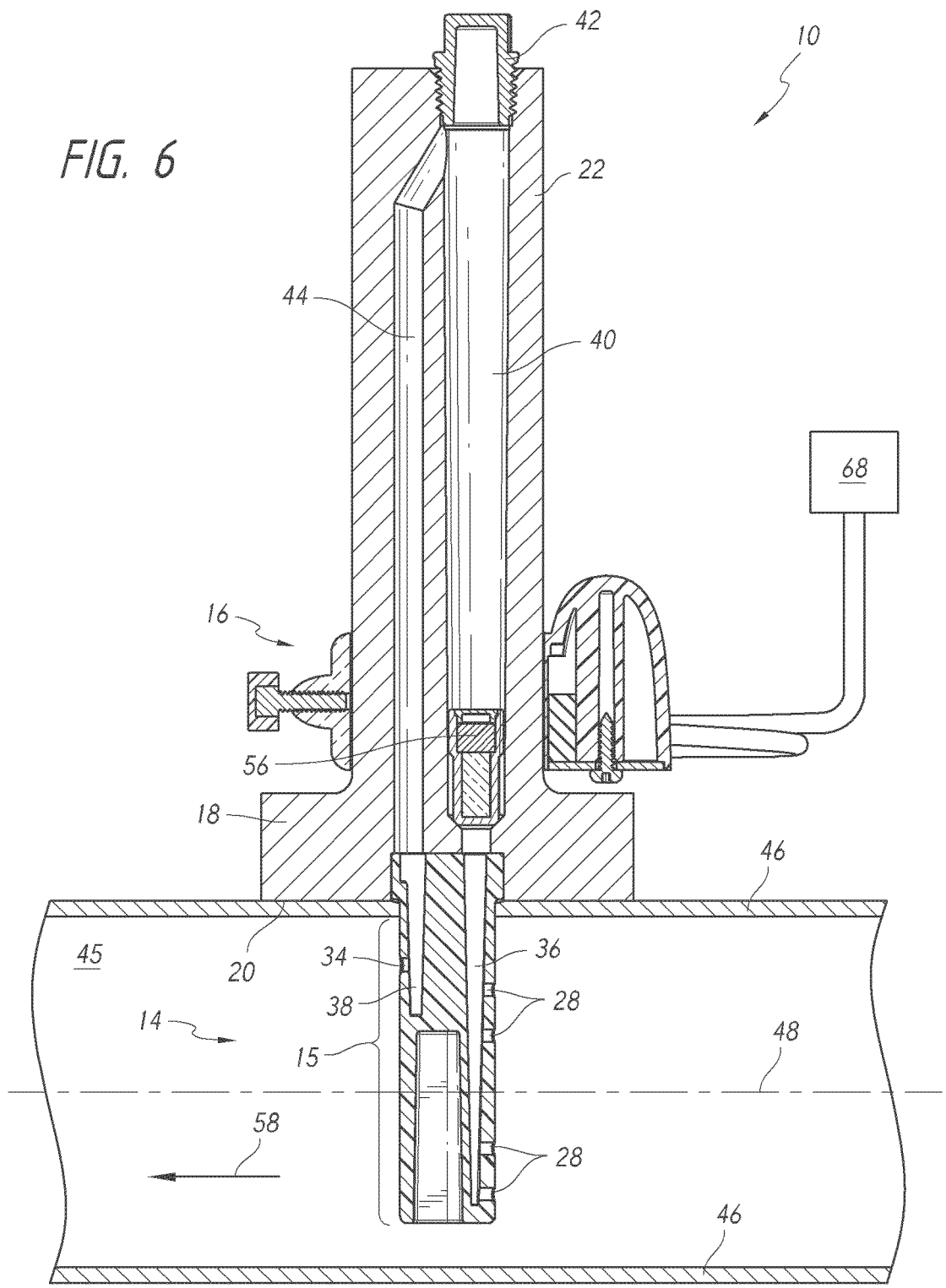
FIG. 6 is a cross-sectional view of the fluid flow sensor of FIG. 1 taken on the plane 6-6 of FIG. 4.

As illustrated in FIG. 6, the sensor tube 14 can include an inlet passage 36. The inlet passage 36 can extend within the sensor tube 14 along a portion of the length of the sensor tube 14. The one or more inlet apertures 38 can extend through the front side 24 of the sensor tube 14 into the inlet passage 36 to facilitate fluid communication between the inlet passage 36 and fluid outside the sensor tube 14. In some embodiments, the inlet passage 36 can extend through more than $1/2$ of the length of the sensor tube 14. In some embodiments, the inlet passage 36 extends through more than $1/4$, more than $1/3$, more than $3/8$, more than $5/8$, more than $4/7$, more than $3/4$, and/or through more than $9/10$ of the length of the sensor tube. Preferably, the inlet passage 36 extends through approximately $19/20$ of the length of the sensor tube 14. Extending the inlet passage 36 through a majority of the length of the sensor tube 14 can facilitate placement of inlet apertures 38 along a greater portion of the diameter or other cross-sectional dimension of the pipe 45 or other fluid flow component to which the sensor 10 is installed.

The sensor tube 14 can include an outlet passage 38. The outlet passage 38 can extend through at least a portion of the length of the sensor tube 14. Preferably, the outlet passage 38 is separate from the inlet passage 36 within the body of the sensor tube 14. The one or more outlet apertures 34 can extend through the back side 26 of the sensor tube 14 into the outlet passage 38. In some embodiments, the outlet passage 38 extends through less than $1/2$ of the length of the sensor tube 14. In some embodiments, the outlet passage 38 extends through less than $9/10$, less than $3/4$, less than $5/8$, less than $3/8$, less than $1/4$, and/or less than $1/8$ of the length of the sensor tube 14. Preferably, the outlet passage 38 extends through approximately $9/20$ of the length of the sensor tube 14.

As illustrated in FIG. 6, the sensor body 12 can include a body inlet passage 40. The body inlet passage 40 can extend within the sensor body 12 through a portion of the length of the sensor body 12. In some embodiments, the body inlet passage 40 extends through the entire length of the sensor body 12. In some embodiments, a cap 42 or other sealing structure is positioned at a downstream end of the body inlet passage 40 (e.g., the end of the body inlet passage 40 furthest from the sensor tube 14 along a flow path of the body inlet passage 40). The cap 42 can be configured to seal the body inlet passage 40 from the exterior of the sensor body 12. As illustrated, an upstream end of the body inlet passage 40 (e.g., the end closest to the sensor tube 14) can be fluidly connected with the inlet passage 36 of the sensor tube 14.

The sensor body 12 can include a body outlet passage 44. The body outlet passage 44 can extend within the sensor body 12 through a portion of the length of the sensor body 12. An upstream end of the body outlet passage 44 can fluidly connect with the body inlet passage 40 at or near the downstream end of the body inlet passage 40. A downstream end of the body outlet passage 44 can fluidly connect to the outlet passage 38 (e.g., the upstream end of the outlet passage 38) of the sensor tube 14.

As illustrated in FIG. 7, the sensor tube 14 can be positioned within a pipe 45 when the sensor 10 is installed on the pipe 45. The inlet aperture(s) 28 and outlet aperture(s) 34 of the sensor tube 14 can be positioned within the pipe 45 between the walls 46 of the pipe 45.

In some embodiments, the sensor tube 14 is sized such that, when the sensor 10 is installed on a pipe 45, a midpoint (e.g., the average position of the inlet apertures 28 along the length of the tube 14) between the first group 30 of inlet apertures 28 and the second group 32 of inlet apertures 28 coincides with an axial centerline 48 of the pipe 45. In some embodiments, the midpoint between the first and second groups 30, 32 of inlet apertures 28 is offset from the axial centerline 48 of the pipe 45.

In some embodiments, an average position of the inlet apertures 28 of the first group 30 can be spaced from the axis 48 of the pipe 45 by a distance 50. The distance 50 between the axis 48 of the pipe 45 and the average position of the first group 30 of inlet apertures 28 can be between about $1/8$ and about $9/20$, between about $1/3$ and about $6/7$, between about $2/9$ and about $3/4$, between about $3/8$ and about $7/8$, and/or between about $2/9$ and about $5/8$ of the radius 52 of the pipe 45. Preferably, the distance 50 between the axis 48 of the pipe 45 and the average position of the first group 30 of inlet apertures 28 is between about $2/5$ and about $5/9$ of the radius 52 of the pipe 45. The distance 50 between the axis 48 and the average position of the first group 30 of inlet apertures 28 can be selected to position the inlet apertures 28 in a portion of the flow path 58 of the pipe 45 where an average velocity of the flow may be measured. For example, the first group 30 of inlet apertures 28 can be positioned at a transition point between primarily laminar flow (at or near the wall 46) and primarily turbulent flow (e.g., at or near the axis 48 of the pipe 45) where an average velocity of the entire flow profile is located. The second group 32 of inlet apertures 28 can be positioned in a same or similar position of the pipe 45, on a side of the axis 48 opposite the first group 30 of inlet apertures 28.

As discussed above, the sensor tube 14 can be positioned at least partially within a pipe 45 when the sensor 10 is installed on the pipe 45. In some embodiments, second group 32 of inlet apertures 28 are positioned closer to the second end of the sensor tube 14 than the first group 32 of inlet apertures 28. For example, the average position of the second group 32 of inlet apertures 28 along the length of the sensor tube 14 can be less than about ½, less than about ⅜, less than about 3/7, less than about ⅓, less than about ¼, and/or less than about 1/10 of the length of the sensor tube 14 away from the second end of the sensor tube 14. In some embodiments, the average position of the second group 32 of the inlet aperture 28 is between approximately 1/7 and approximately ⅛ of the length of the sensor 14 away from the second end of the sensor 14. In some cases, the average position of the first group 30 of inlet aperture 28 along the length of the sensor tube 14 is greater than about ⅓, greater than about ½, greater than about 5/9, greater than about ⅔, greater than about ¾, and/or greater than about 9/10 of the length of the sensor tube 14 away from the second end of the sensor tube 14. Preferable, the average position of the first group 30 of inlet apertures 28 is between approximately ½ and about 13/20 of the length of the sensor tube 14 away from the second end of the sensor tube 14. Positioning the groups 30, 32 of inlet apertures 28 as described above can facilitate positioning the inlet apertures 28 at locations along the velocity profile of flow through a pipe 45 wherein the average velocity of the flow through the pipe 45 can be measured.

As illustrated in FIG. 7, the first group 30 of inlet apertures 28 (e.g., the average position of the group 30) can be positioned a first distance 17a from a first end (e.g., fixed end) 15a of the wetted portion 15 of the sensor tube 14 along a length of the sensor tube 14. The second group 32 of apertures 28 (e.g., the average position of the second group 32) can be positioned a second distance 17b from the average position of the first group 30 of apertures 28. The second distance 17b can be greater than the first distance 17a. In some embodiments, the second distance 17b is at least 1.5 times, at least 1.8 times, at least 2.5 times, at least 3 times, and/or at least 4 times larger than the first distance 17a. Preferably, the second distance 17b is approximately twice as large as the first distance 17a. In some embodiments, a distance 17c between the average position of the second group 32 of apertures 28 and the second (e.g., free) end 15b of the wetted portion 15 of the tube is less than the first distance 17a. In some embodiments, the distance 17c is approximately equal to the first distance 17a. In some embodiments, the distance 17c is greater than the first distance 17a (e.g., the free end 15b of the wetted portion 15b of the tube 14 may extend at least partially into a wall of a pipe).

As illustrated in FIG. 7, the outlet aperture 34 can be positioned a distance 54 from the axis 48 of the pipe 45. The distance 54 of the outlet aperture 34 from the axis 48 of the pipe 45 can be greater than half of the radius 52 of the pipe 45. In some embodiments, the distance 54 of the outlet aperture 34 from the axis 48 of the pipe 45 is greater than about ⅕, greater than about ⅛, greater than about ⅙, greater than about ¼, greater than about ⅓, greater than about ½, and/or greater than about ¾ of the radius 52 of the pipe 45. Preferably, the distance 54 of the outlet aperture 34 from the axis 48 of the pipe 45 is between about ⅗ and about ⅘ of the radius 52 of the pipe 45.

Referring back to FIG. 6, the fluid flow sensor 10 can include a float 56 or other moving indicator. The float 56 can be positioned within the body inlet passage 40. In some embodiments, the float 56 is positioned within the body outlet passage 44. The float 56 or other moving indicator can be configured to move in response to change in velocity of fluid flow through the pipe 45. For example, the float 56 can be configured to move toward the downstream end (e.g., away from the sensor tube 14) of the body inlet passage 40 as velocity within the pipe 45 increases and toward the upstream end (e.g., toward the sensor tube 14) as velocity within the pipe 45 decreases. The float 56 can be calibrated to accurately operate when the sensor body 12 extends upward from the pipe 45, laterally from the pipe 45, downward from the pipe 45, or at any angle there between.

In some embodiments, all or a portion of the sensor body 12 is constructed from a transparent or translucent material (e.g., a polymer, a glass, or some combination thereof). The elongate portion 22, and/or some other portion of the sensor body 12 can include sequential markings. The sequential markings can correspond to velocity through the pipe 45. In some embodiments, the float 56 can be configured to move between different markings when the velocity in the pipe 45 changes, thereby indicating a velocity of fluid in the pipe 45. For example, one marking may indicate a value of "x" feet per second and another marking can indicate "y" feet per second. The float 56 can be configured to move to the marking indicating "x" feet per second when the velocity of the fluid in the pipe 45 reaches "x" feet per second. The float 56 can move to the marking indicating "y" feet per second when the velocity of the fluid in the pipe 45 reaches "y" feet per second. In some embodiments, the markings on the sensor body 22 do not indicate specific values, but rather a spectrum (e.g., shades of gray or a color spectrum). A user of the sensor 10 could observe the position of the float 56 with respect to the spectrum to determine if the velocity of flow through the pipe 45 is too high, too low, or otherwise needs to be adjusted. The float 56 can be constructed from a colored (e.g., red) material (e.g., PVDF or other polymer) to facilitate easy viewing of the float 56 within the sensor body 12.

Figure 8:
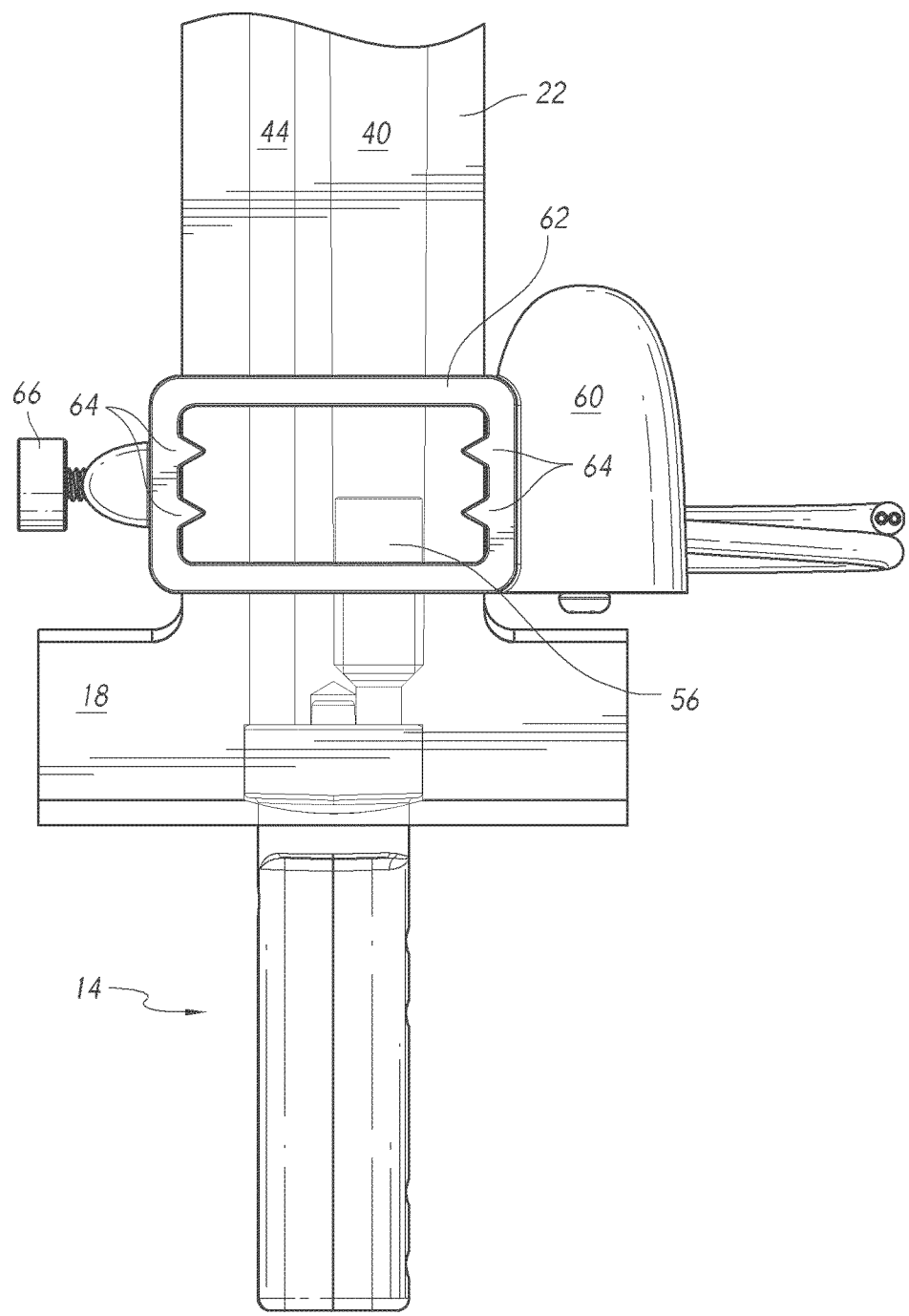
FIG. 8 is a close up left hand side view of the sensor body and signal generator of the fluid flow sensor of FIG. 1, wherein the sensor body is transparent.

As illustrated in FIGS. 6 and 8 and discussed above, the fluid flow sensor 10 can include a signal generator 16. The signal generator 16 can include an electrical or electromagnetic sensor (e.g., a Hall-effect sensor) configured to detect the position of the float 56 of other moving indicator. For example, the float 56 can include a magnet detectable by a sensor 60 of the signal generator 16 when the float 56 is within a predetermined proximity to the sensor 60.

As illustrated in FIG. 8, the signal generator 16 can include a signal frame 62. The signal frame 62 can include one or more indicators 64. The indicators 64 can be, for example, ridges, protrusions, line markings, or other visual indicators. The indicators 64 can be configured to align with one or more of the markings on the sensor body 12 to indicate the fluid flow velocity corresponding to the position of the signal generator sensor 60.

The signal generator 16, or some portion thereof, can be moved along the length of the sensor body 12 (e.g., along the elongate portion 22). The signal generator 16 can include a locking portion 66 configured to releasably lock the signal generator sensor 60 to a position along the length of the elongate portion 22. For example, the locking portion 66 can include a fastener or other locking mechanism configured to tighten the signal generator 16 against the body portion in a desired location.

In use, the signal generator 16 can be configured to send a signal to a flow controller 68 (FIG. 6) or other component of the fluid flow assembly to which the fluid flow sensor 10 is installed. For example, the signal generator sensor 60 can generate an "OFF" signal when the float 56 is positioned outside the velocity range indicated by the indicators 64 of the signal frame 62 (e.g., when the magnet of the float 56 leaves a predetermined proximity to the sensor 60). In some embodiments, the signal generator sensor 60 is configured to cease broadcast of an "ON" signal when the float 56 is positioned outside the velocity range indicated by the indicators 64 of the signal frame 62. The signal generated by the signal generator 16 can help reduce the likelihood of over or under chlorination or some other chemical imbalance in the pool, spa, or other fluid system in which the fluid flow sensor 10 is installed. For example, excessively high and/or excessively low velocities in the pipes of a pool/spa treatment system can indicate a failure to properly cycle, filter, and/or treat water/chemicals through the pool/spa, thereby warranting a shutdown and maintenance of the system. Chemical imbalances can lead to uncomfortable and/or dangerous swimming conditions and can lead to corrosion of one or components of the fluid flow system.

Figure 9:
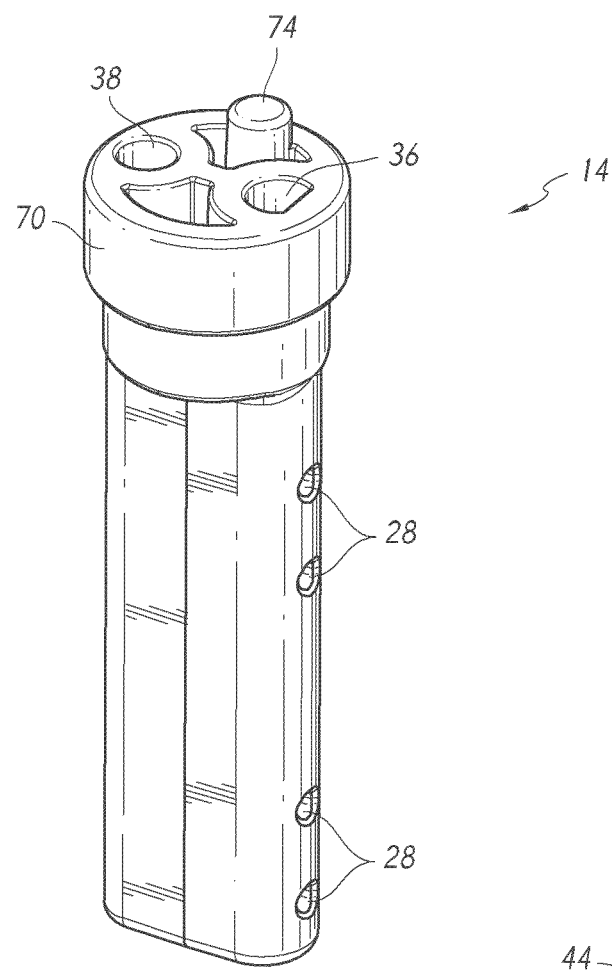
FIG. 9 is a top perspective view of the sensor tube of the fluid flow sensor of FIG. 1.
Figure 10:
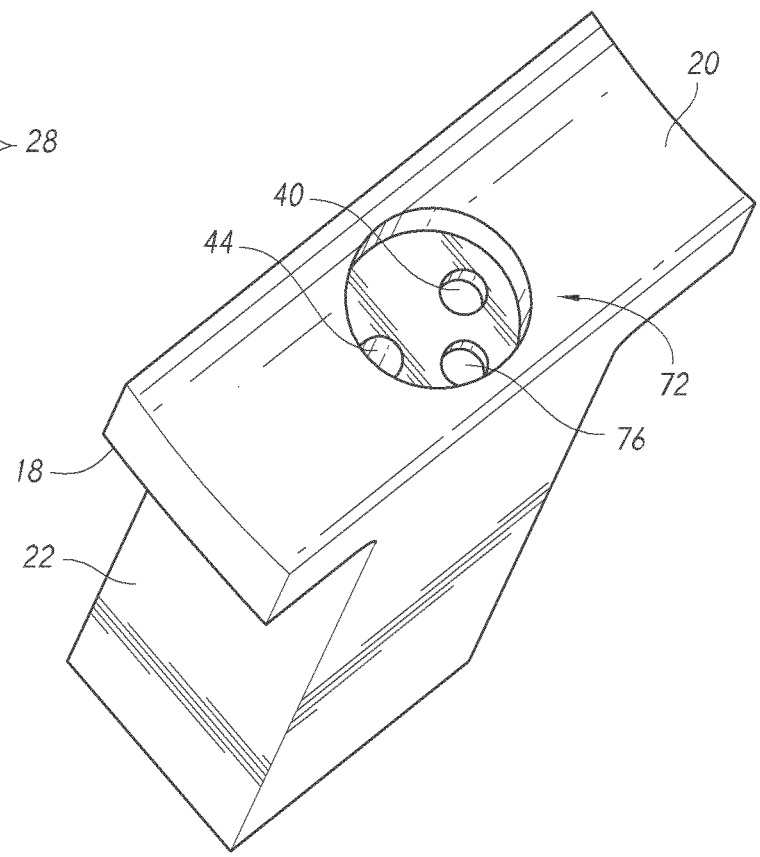
FIG. 10 is a bottom perspective view of the sensor tube of the fluid flow sensor of FIG. 1.

A method of manufacturing, installing, and/or using the fluid flow sensor 10 can include connecting the sensor tube 14 to the sensor body 12. As illustrated in FIG. 9, the sensor tube 14 can include a mating portion 70. The mating portion 70 can be sized and shaped to fit with a connecting portion 72 of the sensor body 12. For example, the mating portion 70 of the sensor tube 14 can have a cross-sectional shape (e.g., a polygon, circle, ellipse, and/or some combination thereof) configured fit a cross-sectional shape of the connecting portion 72 of the sensor body 12. In some embodiments, the mating portion 70 fits at least partially within the connecting portion 72. In some embodiments, all or part of the connecting portion 72 first within the mating portion 70 of the sensor tube 14. In some embodiments, the sensor tube 14 and sensor body 12 are connected via a frictional fit, via welding, via adhesives, and/or via any other appropriate connecting structure or method.

One or both of the sensor tube 14 and the sensor body 12 can include an alignment structure. The alignment structure(s) can be configured to facilitate proper alignment of the sensor tube 14 with respect to the sensor body 12 when the sensor tube 14 is connected to the sensor body 12. For example, the alignment structure(s) can be configured to ensure that the front side 26 of the sensor tube 14 will face oncoming fluid flow in a pipe 45 when the fluid flow sensor 10 is installed. In some embodiments, the alignment structure(s) are configured to ensure that the inlet passage 36 of the sensor tube 14 is fluidly connected to the body inlet passage 40 of the sensor body 12 and that the outlet passage 38 of the sensor tube 14 is fluidly connected to the body outlet passage 44 of the sensor body 12. In some embodiments, the sensor tube 14 includes an alignment protrusion 74 configured to fit at least partially within an alignment recess 76 of the sensor body 12 when the sensor tube 14 is connected to the sensor body 12. In some embodiments, the sensor tube 14 includes an alignment recess configured to receive at least a portion of an alignment protrusion of the sensor body 12 when the sensor tube 14 is connected to the sensor body 12.

In some embodiments, the signal generator 16 can be assembled separately and slid onto the elongate portion 22 of the sensor body 12. Integrating the signal generator 16 with the sensor body 12 can reduce costs associated with installing a separate signal generator/sensor upstream or downstream of the fluid flow rate sensor 10. The float 56 can be inserted into the inlet body passage 40 via an aperture in the sensor body 12 (e.g., the aperture plugged by the cap 42.

In some embodiments, installing the sensor 10 onto a pipe 45 can include drilling or otherwise making a hole in the wall 46 of the pipe 45. The hole can be sized and shaped to receive the sensor tube 14. For example, the hole can have a same or similar diameter as the mating portion 70 of the sensor tube 14. In some embodiments, adhesives or other sealants can be applied in and/or around the hole after inserting the sensor tube 14 in order to reduce the likelihood of fluid leakage from the pipe 45. In some embodiments, the fluid flow sensor 10 can be pre-assembled with a length of pipe, and the preassembled length of pipe can be connected on each end to an existing fluid flow pipe or other component of a fluid flow system.

It can be desirable to install the fluid flow sensor 10 in a portion of pipe 45 upstream or downstream from one or more pipe bends. At the same time, it may be essential that the fluid flow sensor 10 accurately and precisely measure fluid flow within an accepted level of precision (e.g., within ±10% and/or within ±5%). In some cases, as one of skill in the art would appreciate, the fluid flow sensor 10 accurately and precisely measures fluid flow within ±10% and/or within ±5% of the reading. Precision of the sensor 10 can depend on a number of variables. For example, the uniformity of the fluid flow within the pipe 45 can affect precision and/or accuracy of the flow rate sensor 10. The stability (e.g., bounciness) of the float 56 can affect precision in sensor 10. In some embodiments, the fluid flow sensor 10 is configured to operate with required accuracy and/or precision when installed at least two diameters (e.g., of the pipe 45) upstream of a bend. In some embodiments, the fluid flow sensor 10 is configured to operate with required accuracy and/or precision when installed at least five diameters downstream of a bend. The ability of the fluid flow sensor 10 to operate precisely and accurately when in close proximity to bends in the pipe 45 can facilitate installation of the sensor 10 in many private and commercial pool/space systems, wherein space restrictions limit the maximum the available length for straight pipes.

As explained above, the sensor tube 14 can include four inlet apertures 28 and one outlet aperture 34. A four to one ratio of inlet area verses outlet area of the sensor tube 14 has been found to facilitate the required accuracy of the flow rate sensor 10 while maintaining the above-described installation parameters (e.g., distance upstream and downstream from bends). Changing the inlet/outlet ratio of the sensor tube 14 can negatively affect the precision of the sensor 10 by, for example, introducing increased "bounce" to the float 56.

FIGS. 11-16 illustrate an embodiment of a flow rate sensor 110 that has many of the same or similar features as the above-described flow rate sensor 10. For example, the sensor body 112 and signal generator 116 of the flow rate sensor 110 can be identical or substantially identical to the sensor body 12 and signal generator 16 of the flow rate sensor 10. In the illustrated embodiments of FIGS. 11-16, the numeral "1" is added to the beginning of reference numbers to denote features shared by the sensor 10 and the sensor 110 which, unless otherwise explained below, are identical or similar to each other (e.g., sensor body 12 v. sensor body 112).

In some embodiments, the flow rate sensor 110 can be configured to be used in pipes 45 having larger diameters. For example, the flow rate sensor 110 may be sized, shaped, and/or configured to be used to measure flow in a direction 58 through a pipe 45 having a diameter greater than approximately two inches. In some embodiments, the flow rate sensor 10 is configured to be used to measure flow through pipes 45 having diameters of less than about two inches. According to some variants, both the sensors 10 and 110 may be suitable for use in pipes having a wide variety of diameters.

Figure 11:
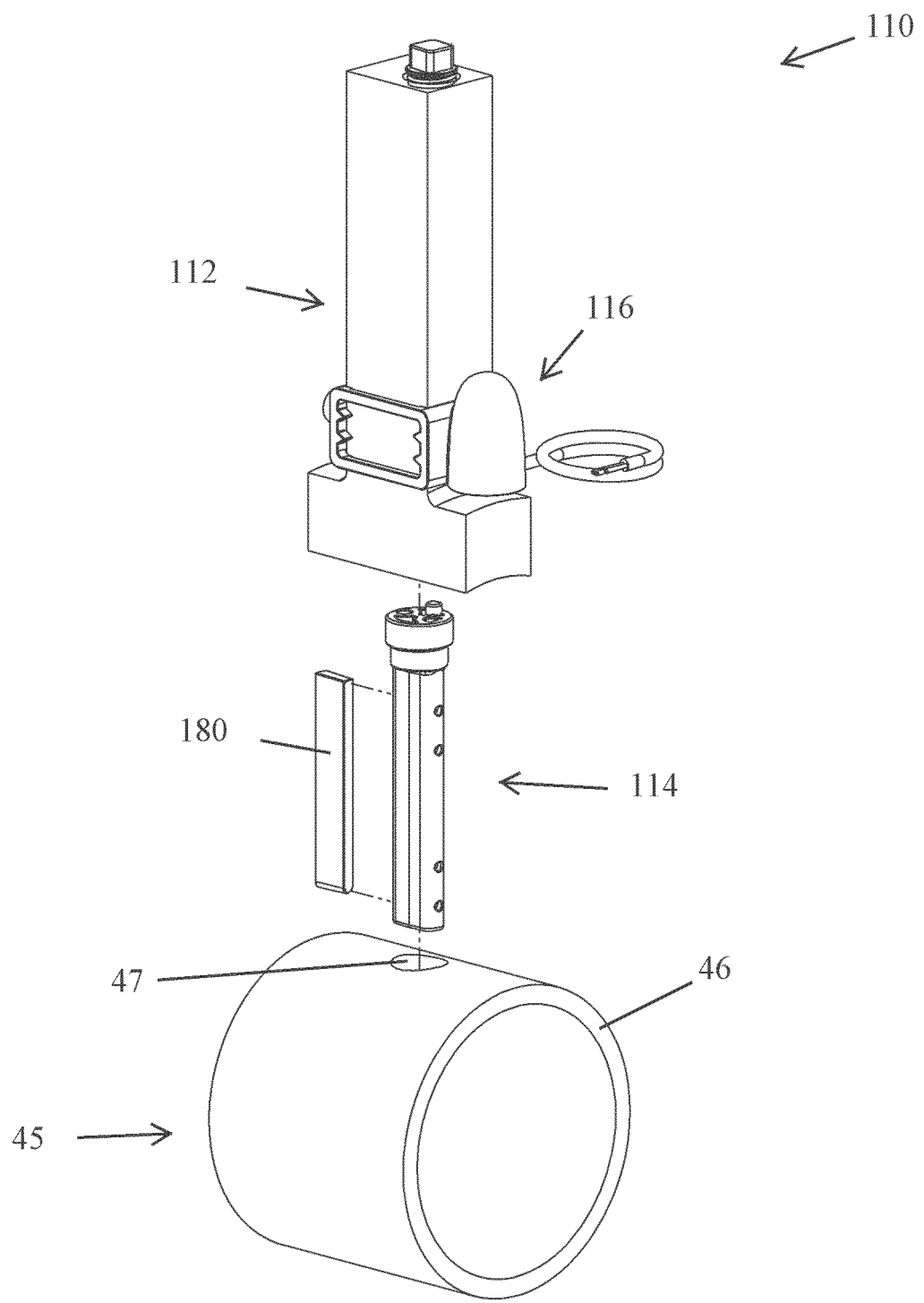
FIG. 11 is a front exploded perspective view of another embodiment of a fluid sensor.
Figure 12:
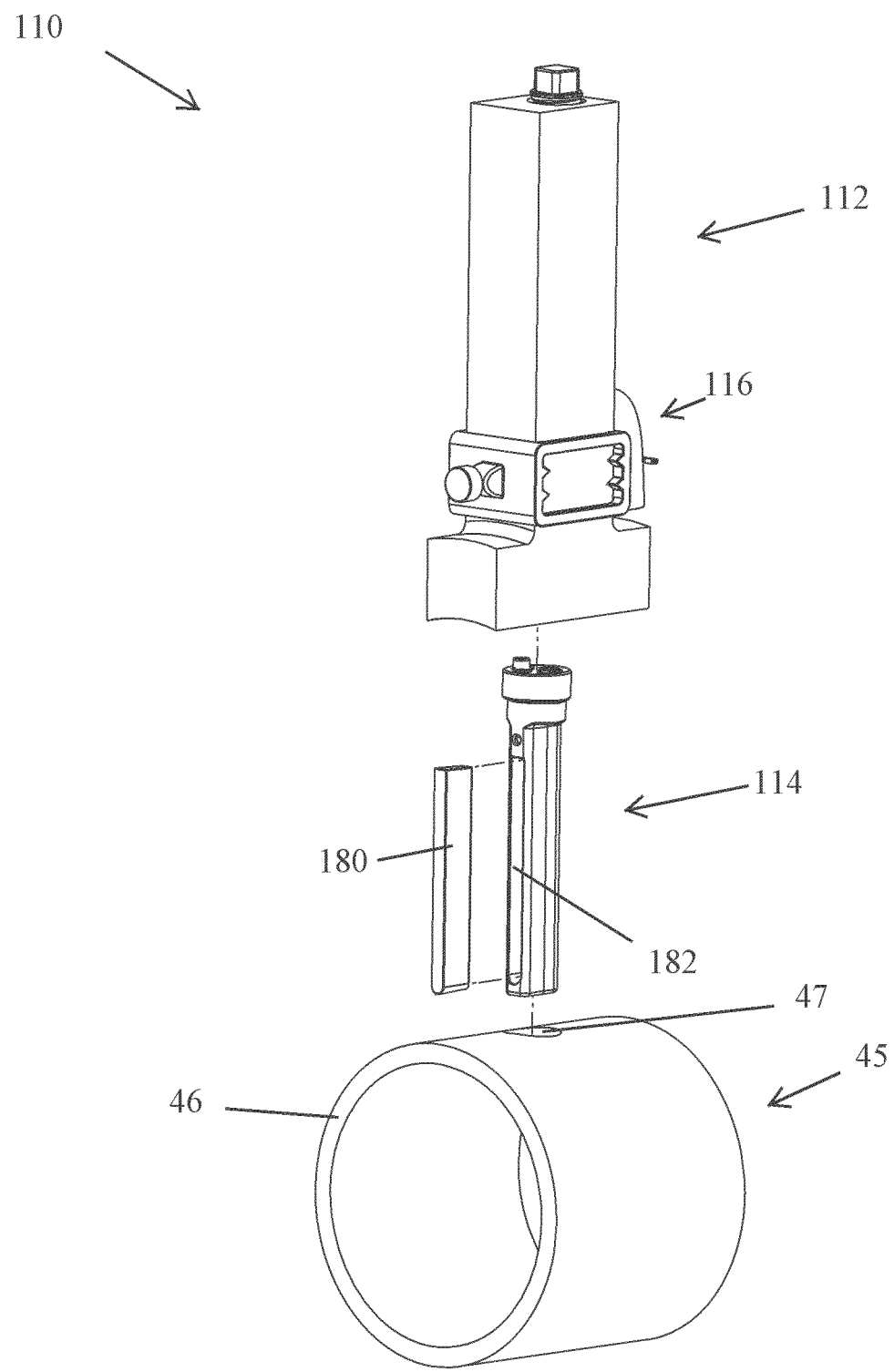
FIG. 12 is a rear exploded perspective view of the flow rate sensor of FIG. 11.
Figure 13:
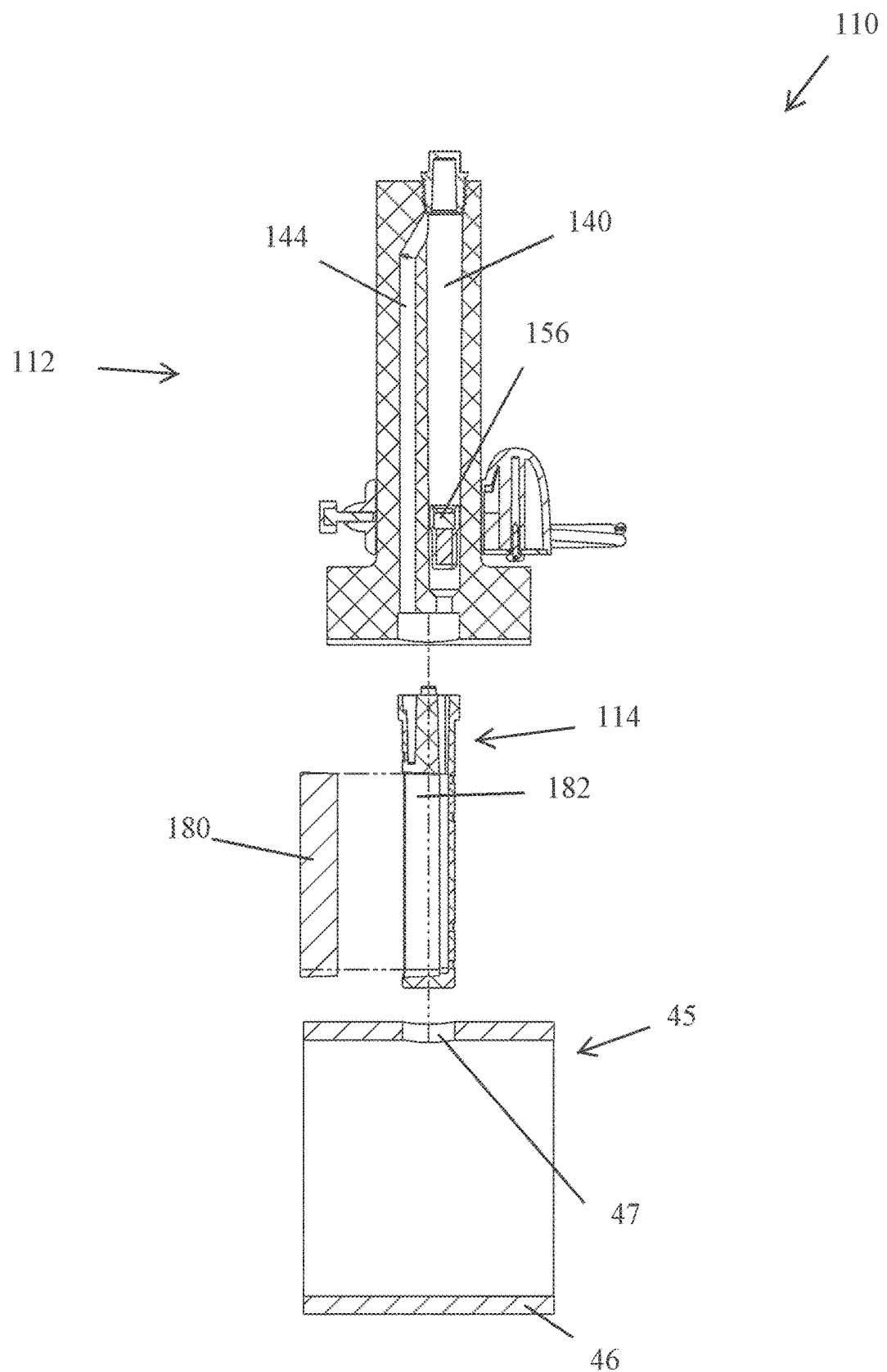
FIG. 13 is a front cross-sectional exploded view of the flow rate sensor of FIG. 11.

As illustrated in FIGS. 11-13, the flow rate sensor 110 can include a plug 180. The plug 180 can be sized and shaped to fit at least partially within a tube recess 182 on the back side 126 of the fluid flow interface portion 114. The plug 180 can be mated with the recess 182 or some other portion of the fluid flow interface 114 via welding (e.g., sonic welding), via adhesives, via one or more fasteners, and/or via friction fit or some other appropriate mating method or structure. In some embodiments, the plug 180 is separate from the outlet passage 138 of the fluid flow interface portion 114.

Figure 14:
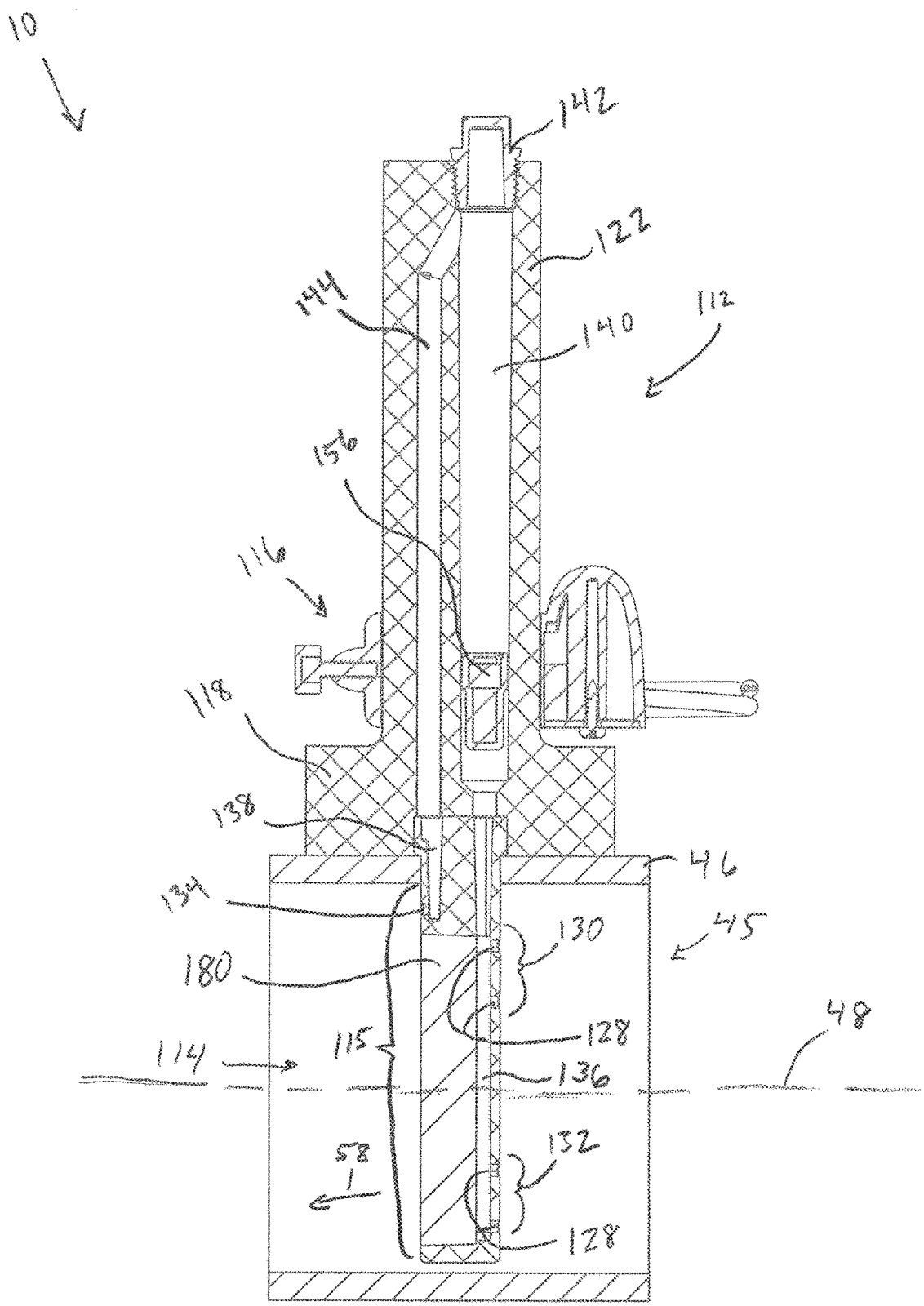
FIG. 14 is front cross-sectional assembled view of the flow rate sensor of FIG. 11 along the same cross-sectional plan as FIG. 13.
Figure 15:
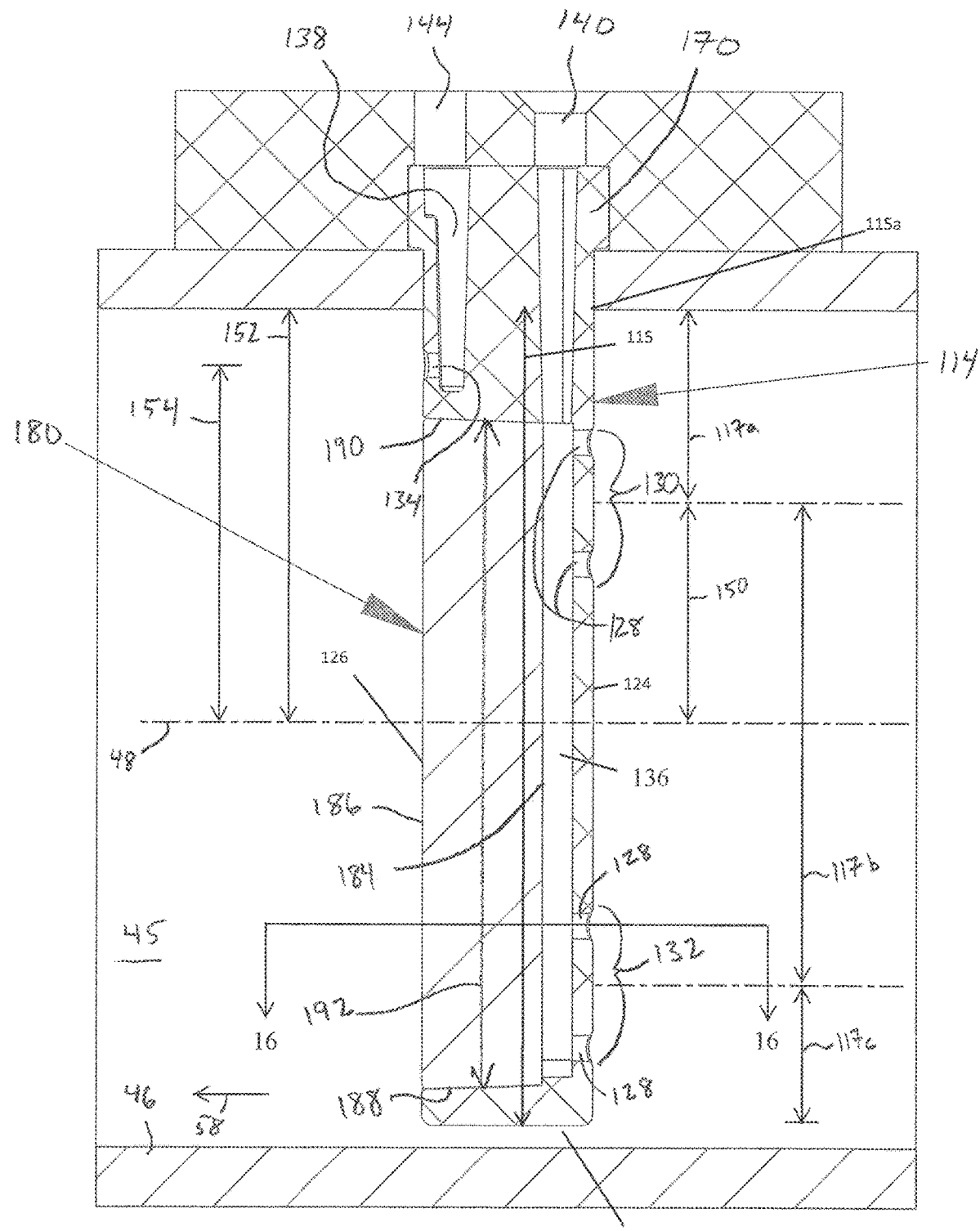
FIG. 15 is a close up cross-sectional view of the fluid flow interface portion of the flow rate sensor of FIG. 11.

Referring to FIGS. 14 and 15, the plug 180 has a front side 184 and a back side 186. The front and back sides 184, 186 can be oriented to match the orientation of the front and back sides 124, 126 of the fluid flow interface portion 114. The plug 180 can have a length 192 defined between a first end 188 and a second end 190 of the plug 180. In some embodiments, the front side 184 can partially define a portion of the inlet passage 136 of the fluid flow interface portion 114. For example, the front side 184 can extend along at least ⅓, at least ½, at least ⅝, at least ⅗, and/or at least ⅔ of the length of the inlet passage 136. In some embodiments, the front side 184 of the plug 180 extends along approximately 7/10 of the inlet passage 136. Forming at least a portion of the inlet passage 136 with the plug 180 can reduce the length of a pin or other structure which may be used to form the body of the fluid flow interface portion 114. For example, the fluid flow interface portion 14 may be formed as a monolithic part using methods such as injection molding or other molding or milling processes. In the longer fluid flow interface 114, a longer pin may be used to form the inlet passage 136, in an embodiment wherein the entire fluid flow interface 114 is formed as a monolithic part. On the other hand, using a separate plug 180 to form a portion of the inlet passage 136 can reduce the length of the pin used to form the remainder of the inlet passage 136 (e.g., the portion of the inlet passage 136 above the plug 180 in the frame of reference of FIG. 15).

Figure 16:
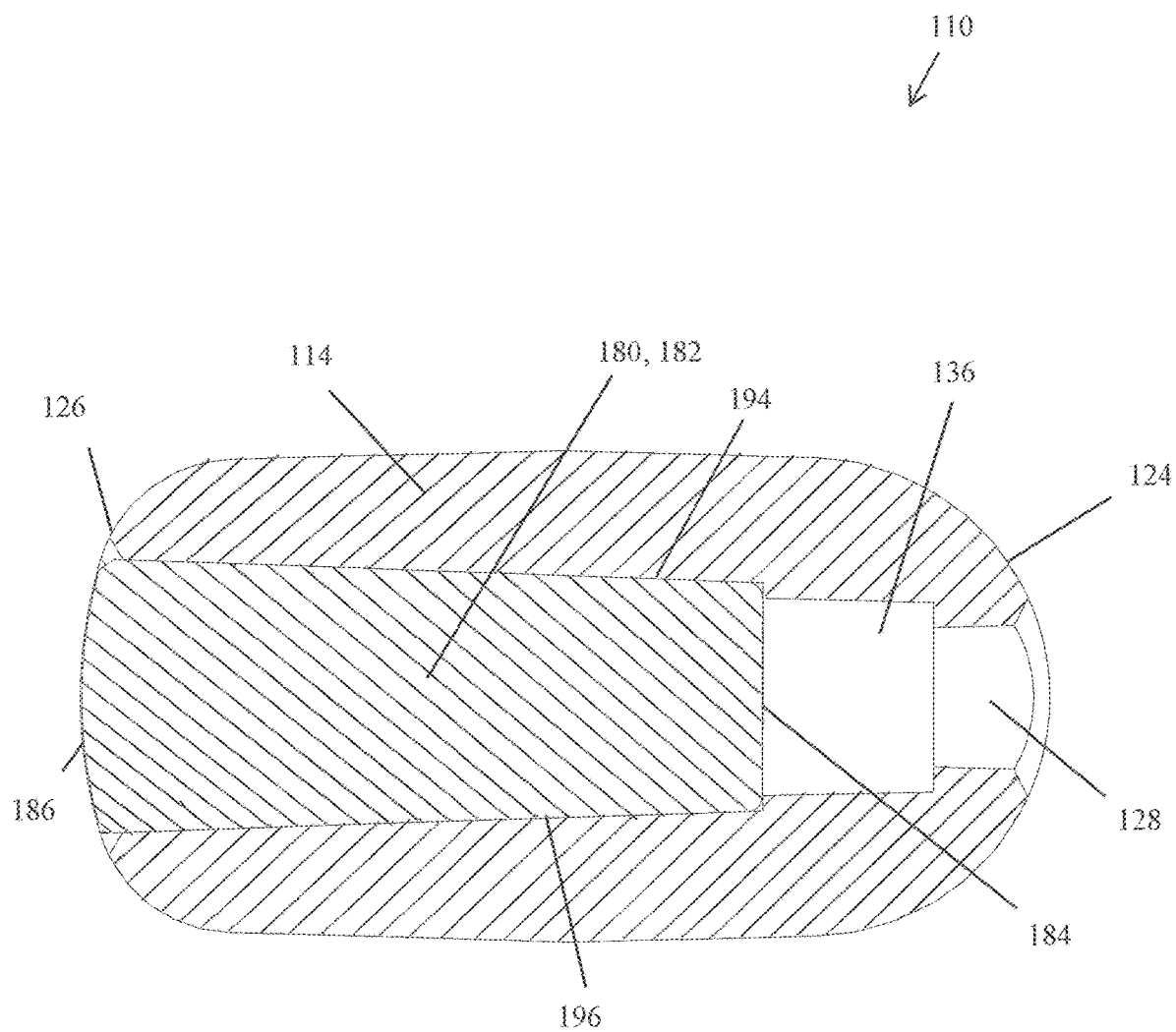
FIG. 16 is a cross-sectional view of the fluid flow interface portion of the flow rate sensor of FIG. 11 taken on the plane 16-16 of FIG. 15.

The plug 180 can have a generally wedge-shaped profile as viewed along the length 192 of the plug 180 (e.g., the perspective of FIG. 16). For example, the plug 180 can have two lateral surfaces 194, 196 which extend along at least a portion of the thickness of the plug 180 between the front and back sides 184, 186 of the plug 180. The lateral surfaces 194, 196 can taper and/or curve toward each other in a direction from the back side 186 of the plug 180 toward the front side 184 of the plug 180. The cavity 182 can be similarly or identically shaped to receive the plug 180. Forming the plug 180 with a wedge-shaped profile can facilitate easier installation of the plug 180 into the cavity 182.

As illustrated in FIG. 16, the plug 180 can be sized and shaped such that back side 186 of the plug 180 is flush with, or substantially flush with the back side 126 of the fluid flow interface portion 114. In some such embodiments, added turbulence introduced by the plug 118 can be minimized or eliminated when the fluid flow sensor 110 is installed on a pipe. In some embodiments, the interfaces (e.g., corners) between the lateral surfaces 194, 196 and the front side 184 of the plug can be chamfered and/or radiused. In some such embodiments, the chamfering or radiusing of the front corners of the plug 180 can reduce the risk of gaps forming between the front surface 184 of the plug 180 and the portions of the recess 182 which are contacted by the front surface 184 when the fluid flow interface portion 114 is assembled. In some embodiments, the plug 180 and/or recess 182 include one or more features (e.g., keys) configured to limit the number of orientations in which the plug 180 can be mated with the recess 182. For example, as illustrated in FIG. 12, the bottom or first end 188 of the plug 180 can be radiused in a shape different from that of the second end 190 of the plug 180. The recess 182 can include matching or substantially matching shaped features. In some such embodiments, the radiusing or other shape modification of a portion of the plug 180 can reduce the likelihood that the plug 180 is assembled in an undesired orientation.

In some embodiments, the front surface 184 of the plug 180 has an arcuate surface (e.g., in the frame of reference of FIG. 16). For example, the front surface 184 can be concave or convex. In some embodiments, the front surface 184 is flat or substantially flat. In some embodiments, the plug 180 is constructed as a solid part without internal recesses or channels. In some embodiments, the plug 180 includes one or more internal or partially internal recesses or channels. For example, the plug 180 can include an internal channel that forms a portion of the inlet passage 136. In some embodiments, the plug 180 includes one or more recesses or internal channels to reduce the weight and/or increase the flexibility/compressibility of the plug 180.

As illustrated in FIG. 15, the sensor tube 114 can be sized such that, when the sensor 110 is installed on a pipe 45, a midpoint (e.g., the average position of the inlet apertures 128 along the length of the fluid flow interface portion 114) between the first group 130 of inlet apertures 128 and the second group 132 of inlet apertures 128 coincides with an axial centerline 48 of the pipe 45. In some embodiments, the midpoint between the first and second groups 130, 132 of inlet apertures 128 is offset from the axial centerline 48 of the pipe 45.

In some embodiments, an average position of the inlet apertures 128 of the first group 130 can be spaced from the axis 48 of the pipe 45 by a distance 150. The distance 150 between the axis 48 of the pipe 45 and the average position of the first group 130 of inlet apertures 128 can be between about ⅛ and about 9/20, between about ⅓ and about 6/7, between about ⅖ and about ¾, between about ⅜ and about ⅞, and/or between about ⅖ and about ⅝ of the radius 52 of the pipe 45. Preferably, the distance 150 between the axis 48 of the pipe 45 and the average position of the first group 130 of inlet apertures 128 is between about 3/10 and about 7/20 of the radius 52 of the pipe 45. The distance 150 between the axis 48 and the average position of the first group 130 of inlet apertures 128 can be selected to position the inlet apertures 128 in a portion of the flow path 58 of the pipe 45 where an average velocity of the flow may be measured. For example, the first group 130 of inlet apertures 128 can be positioned at a transition point between primarily laminar flow (at or near the wall 46) and primarily turbulent flow (e.g., at or near the axis 48 of the pipe 45) where an average velocity of the entire flow profile is located. The second group 132 of inlet apertures 128 can be positioned in a same or similar position of the pipe 45, on a side of the axis 48 opposite the first group 130 of inlet apertures 128.

The fluid flow interface portion 114 can be positioned at least partially within a pipe 45 when the sensor 110 is installed on the pipe 45. In some embodiments, the second group 132 of inlet apertures 128 is positioned closer to the second end (e.g., free end) of the sensor tube 114 than the first group 132 of inlet apertures 128. For example, the average position of the second group 132 of inlet apertures 128 along the length of the sensor tube 114 can be less than about ½, less than about ⅜, less than about 3/7, less than about ⅓, less than about ¼, and/or less than about 1/10 of the length of the sensor tube 114 away from the second end of the sensor tube 114. In some embodiments, the average position of the second group 132 of the inlet aperture 128 is between approximately ⅙ and approximately ⅐ of the length of the sensor 114 away from the second end of the sensor 114. In some cases, the average position of the first group 130 of inlet apertures 128 along the length of the fluid flow interface portion 114 is greater than about ⅓, greater than about ½, greater than about ⅝, greater than about ⅔, greater than about ¾, and/or greater than about 9/10 of the length of the sensor tube 114 away from the second end of the sensor tube 114. Preferable, the average position of the first group 30 of inlet apertures 28 is between approximately ⅗ and about 7/10 of the length of the sensor tube 114 away from the second end of the sensor tube 114. Positioning the groups 130, 132 of inlet apertures 128 as described above can facilitate positioning the inlet apertures 128 at locations along the velocity profile of flow through a pipe 45 wherein the average velocity of the flow through the pipe 45 can be measured.

Referring to FIG. 15, the first group 130 of inlet apertures 128 (e.g., the average position of the group 130) can be positioned a first distance 117a from a first end (e.g., fixed end) 115a of the wetted portion 115 of the sensor tube 114 along a length of the sensor tube 114. The second group 132 of apertures 128 (e.g., the average position of the second group 132) can be positioned a second distance 117b from the average position of the first group 130 of apertures 128. The second distance 117b can be greater than the first distance 117a. In some embodiments, the second distance 117b is at least 1.5 times, at least 1.8 times, at least 2.5 times, at least 3 times, and/or at least 4 times larger than the first distance 117a. Preferably, the second distance 117b is approximately two and one half times as large as the first distance 117a. In some embodiments, a distance 117c between the average position of the second group 132 of apertures 128 and the second (e.g., free) end 115b of the wetted portion 115 of the tube 114 is less than the first distance 117a. In some embodiments, the distance 117c is approximately equal to the first distance 117a. In some embodiments, the distance 117c is greater than the first distance 117a (e.g., the free end 115b of the wetted portion 115 of the tube 114 may extend at least partially into a wall of a pipe).

As illustrated in FIG. 15, the outlet aperture 134 can be positioned a distance 154 from the axis 48 of the pipe 45. The distance 154 of the outlet aperture 134 from the axis 48 of the pipe 45 can be greater than half of the radius 52 of the pipe 45. In some embodiments, the distance 154 of the outlet aperture 134 from the axis 48 of the pipe 45 is greater than about ⅑, greater than about ⅛, greater than about ⅙, greater than about ¼, greater than about ⅓, greater than about ½, and/or greater than about ¾ of the radius 52 of the pipe 45. Preferably, the distance 54 of the outlet aperture 34 from the axis 48 of the pipe 45 is between about ⅘ and about 9/10 of the radius 52 of the pipe 45.

The terms "approximately", "about", "generally" and "substantially" as used herein represent an amount close to the stated amount that still performs a desired function or achieves a desired result. For example, the terms "approximately", "about", "generally," and "substantially" may refer to an amount that is within less than 10% of the stated amount.

While the preferred embodiments of the present inventions have been described above, it should be understood that they have been presented by way of example only, and not of limitation. It will be apparent to persons skilled in the relevant art that various changes in form and detail can be made therein without departing from the spirit and scope of the inventions. Thus the present inventions should not be limited by the above-described exemplary embodiments, but should be defined only in accordance with the following claims and their equivalents. Furthermore, while certain advantages of the inventions have been described herein, it is to be understood that not necessarily all such advantages may be achieved in accordance with any particular embodiment of the inventions. Thus, for example, those skilled in the art will recognize that the inventions may be embodied or carried out in a manner that achieves or optimizes one advantage or group of advantages as taught herein without necessarily achieving other advantages as may be taught or suggested herein.

What is claimed is:

1. A flow rate assembly, comprising:
    a sensor body configured to be positioned at least partially outside of a pipe, the sensor body defining a fluid passage, a fluid passage inlet and a fluid passage outlet; and
    a fluid flow interface portion configured to be positioned at least partially within an interior of the pipe when the flow rate assembly is installed on the pipe, the fluid flow interface portion having a first end and a second end, the fluid flow interface portion defining an inlet passage in direct fluid communication with the fluid passage inlet, an outlet passage in direct fluid communication with the fluid passage outlet, a plurality of inlet apertures extending through a first wall of the fluid flow interface portion into the inlet passage, and an outlet aperture extending through a second wall of the fluid flow interface portion on a side of the fluid flow interface portion opposite the inlet apertures, the fluid flow interface portion comprising:
    a first body section defining an elongate recess extending longitudinally between the first end and the second end of the fluid flow interface portion; and
    a longitudinal plug mating with the recess of the fluid flow interface portion, the plug forming a portion of the second wall of the fluid flow interface portion.

2. The flow rate assembly of claim 1, further comprising a moving indicator configured to move in response to fluid flow into the plurality of inlet apertures of the fluid flow interface portion.

3. The flow rate assembly of claim 1, further comprising a float positioned within the fluid passage of the sensor body.

4. The flow rate assembly of claim 3, wherein the float is configured to move along the fluid passage in response to fluid flow through at least one inlet aperture of the fluid flow interface portion.

5. The flow rate assembly of claim 3, wherein a position of the float between the upstream and downstream ends of the inlet passage indicates a flow rate of fluid into the plurality of inlet apertures of the fluid flow interface portion.

6. The flow rate assembly of claim 2, comprising a signal generator connected to the sensor body and configured detect and output signals in response to positioning the moving indicator into or out from a predetermined range between the upstream and downstream ends of the inlet passage.

7. The flow rate assembly of claim 1, comprising the pipe, wherein:
    the fluid flow interface portion is positioned at least partially within the pipe;
    the plurality of inlet apertures are oriented toward oncoming flow within the pipe; and
    the outlet aperture is oriented away from oncoming flow within the pipe.

8. The flow rate assembly of claim 7, wherein the flow rate assembly is configured to measure a flow rate of fluid through a pipe within 10% accuracy of the reading in a flow rate range between 2 feet per second and 10 feet per second.

9. The flow rate assembly of claim 7, wherein the flow rate assembly is configured to measure flow rate of fluid through a pipe within 5% accuracy of the reading in a flow rate range between 2 feet per second and 10 feet per second.

\* \* \* \* \*